(12) United States Patent
Bedoukian

(10) Patent No.: US 11,224,223 B2
(45) Date of Patent: *Jan. 18, 2022

(54) **FEEDING DETERRENCE OF PESTS SUCH AS *HEMIPTERA, LEPIDOPTERA* AND *COLEOPTERA***

(71) Applicant: BEDOUKIAN RESEARCH, INC., Danbury, CT (US)

(72) Inventor: Robert H. Bedoukian, West Redding, CT (US)

(73) Assignee: Bedoukian Research, Inc., Danbury, CT (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/531,446

(22) Filed: Aug. 5, 2019

(65) Prior Publication Data

US 2020/0022367 A1 Jan. 23, 2020

Related U.S. Application Data

(63) Continuation-in-part of application No. 16/131,412, filed on Sep. 14, 2018, now abandoned, which is a
(Continued)

(51) Int. Cl.
*A01N 43/16* (2006.01)
*A01N 31/06* (2006.01)
(Continued)

(52) U.S. Cl.
CPC ............. *A01N 43/16* (2013.01); *A01N 31/06* (2013.01); *A01N 35/06* (2013.01); *A01N 37/02* (2013.01);
(Continued)

(58) Field of Classification Search
CPC ........ A01N 43/16; A01N 31/06; A01N 37/02; A01N 37/36; A01N 37/18; A01N 43/08;
(Continued)

(56) References Cited

U.S. PATENT DOCUMENTS 4,332,941 A 6/1982 Berthold et al.
5,118,711 A 6/1992 Wilson et al.
(Continued)

FOREIGN PATENT DOCUMENTS

JP 63-48203 2/1988
JP 2-131405 5/1990
(Continued)

OTHER PUBLICATIONS

International Search Report dated Jul. 10, 2013 from PCT/US2013/000120, 3 pages.

Written Opinion dated Jul. 10, 2013 from PCT/US2013/000120, 15 pages.
IPRP dated Nov. 13, 2014 from corresponding PCT Application No. PCT/US2013/000120, 10 pages.
First Office Action, with translation, dated Oct. 27, 2015 from corresponding Chinese Application No. 201380022820.4, 16 pages.
Chunfu et al.; "Effect of Induced Resistance of Larix gmelinii on Growth and Development of Lymantria dispar"; Journal of Northeast Forestry University; May 2010; vol. 38, No. 5, 2 pages.
Dettner et al; "Defensive Secretions of Three Oxytelinae Rove Beetles (Coleoptera: Staphylinidae)"; Journal of Chemical Ecology; Mar. 1982; vol. 8, No. 11, 10 pages.
(Continued)

*Primary Examiner* — Sahar Javanmard
(74) *Attorney, Agent, or Firm* — Ohlandt, Greeley, Ruggiero & Perle, LLP

(57) ABSTRACT

Compounds are used as agents that deter feeding by insect pests, such as *Hemiptera, Lepidoptera* and *Coleoptera*. Feeding deterrence is obtained by contact of the insect pests with at least one of the compounds of the structure (I)

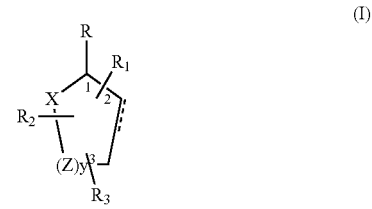

wherein R is —OH, =O, —OC(O)$R_4$, —OR$_6$, or —(OR$_6$)$_2$, each R$_6$ is independently an alkyl group containing from 1 to 4 carbon atoms and R$_4$ is a branched or straight chain, saturated or unsaturated, hydrocarbyl group with zero to two double bonds and from 1 to 15 carbon atoms; X is O or CH$_2$ with the proviso that when X is O, R can only be =O; each Z is independently (CH) or (CH$_2$); y is a numeral selected from 1 and 2; R$_1$ is H or a branched or straight chain, saturated or unsaturated hydrocarbyl group with zero to two double bonds and from 1 to 15 carbon atoms; R$_2$ is H or a branched or straight chain, saturated or unsaturated hydrocarbyl group with zero to three double bonds and from 1 to 15 carbon atoms; R$_3$ is selected from H, a branched or straight chain, saturated or unsaturated hydrocarbyl group with zero to three double bonds and from 1 to 15 carbon atoms, —(CH$_2$)$_n$OH, —C(O)OR$_5$, —CH$_2$C(O)OR$_7$, —CH$_2$C(O)R$_8$, —C(O)NR$_9$R$_{10}$, and —CH$_2$C(O)NR$_{11}$R$_{12}$ where each of R$_5$, R$_7$, R$_8$, R$_9$, R$_{10}$, R$_{11}$ and R$_{12}$ is independently selected from H and a branched or straight chain, saturated or unsaturated hydrocarbyl group with zero to three double bonds and from 1 to 15 carbon atoms and n is an integer of from 1 to 12; the bond between the 2 and 3 positions in the ring structure may be a single or a double bond; and wherein the compounds of structure (I) contain from 9 to 20 total carbon atoms in the compounds.

20 Claims, 7 Drawing Sheets

Related U.S. Application Data continuation of application No. 14/390,826, filed as application No. PCT/US2013/000120 on Apr. 30, 2013, now Pat. No. 10,111,429.

(60) Provisional application No. 61/687,920, filed on May 2, 2012.

(51) Int. Cl.

| | |
|---|---|
| *A01N 37/02* | (2006.01) |
| *A01N 37/36* | (2006.01) |
| *A01N 37/18* | (2006.01) |
| *A01N 43/08* | (2006.01) |
| *A01N 35/06* | (2006.01) |
| *A01N 49/00* | (2006.01) |
| *A01N 37/06* | (2006.01) |
| *A01N 37/42* | (2006.01) |

(52) U.S. Cl.
CPC ............ *A01N 37/06* (2013.01); *A01N 37/18* (2013.01); *A01N 37/36* (2013.01); *A01N 37/42* (2013.01); *A01N 43/08* (2013.01); *A01N 49/00* (2013.01)

(58) Field of Classification Search
CPC ........ A01N 35/06; A01N 49/00; A01N 37/06; A01N 37/42
See application file for complete search history.

(56) References Cited

U.S. PATENT DOCUMENTS

| | | | |
|---|---|---|---|
| 6,060,507 | A | 5/2000 | Hill et al. |
| 7,622,498 | B2 | 11/2009 | Justino et al. |
| 8,551,510 | B2 | 10/2013 | Bedoukian |
| 2010/0278755 | A1 | 11/2010 | Dell |
| 2011/0124877 | A1 | 5/2011 | Ito et al. |
| 2012/0046359 | A1 | 2/2012 | Bedoukian |
| 2012/0076674 | A1 | 3/2012 | Nomura et al. |
| 2012/0077674 | A1 | 3/2012 | Cargeeg et al. |

FOREIGN PATENT DOCUMENTS

| | | |
|---|---|---|
| JP | 4-164079 | 6/1992 |
| JP | 5-178706 | 7/1993 |
| JP | 7-138102 | 5/1995 |
| JP | 2002-356404 | 12/2002 |
| JP | 2005-41805 A | 2/2005 |
| JP | 2005-162730 | 6/2005 |
| JP | 2007-502860 | 2/2007 |
| JP | 2009-256311 | 11/2009 |
| JP | 2009-542789 | 12/2009 |
| JP | 2013/126960 | 6/2013 |
| WO | 01/41568 A2 | 6/2001 |
| WO | 2004/100971 A1 | 11/2004 |
| WO | 2008/007100 A2 | 1/2008 |
| WO | 2008012756 A3 | 1/2008 |
| WO | 2009049378 A1 | 4/2009 |
| WO | 2012/047608 A2 | 4/2012 |

OTHER PUBLICATIONS

Japanese Office Action dated Feb. 23, 2016 from corresponding Japanese Application No. JP-2015-510248, 10 pages.
Chinese Office Action dated May 4, 2016 from corresponding Chinese Patent Application No. 201380022820.4, 12 pages.
Chinese Third Office Action dated Oct. 10, 2016 from corresponding Chinese Patent Application No. 201380022820.4, 18 pages.
European Extended Search Report dated Oct. 21, 2016 from corresponding European Patent Application No. 13784833.9, 16 pages.
Brunissen et al.; "Effects of systemic potato response to wounding and jasmonate on the aphid Macrosiphum euphorbiae (Sternorryncha: Aphididae)", J Appl Entomol, 134, 2010, pp. 562-571.
Dancewicz et al.; "Effect of Oxygen Incorporation Into Cyclohexanone Ring on Antifeedant Activity", Journal of Plant Protection Research, vol. 51, No. 1, 2011, pp. 23-28.
Dancewicz et al.; "Feeding Deterrent Activity of α-Methylenelactones to PEA Aphid *Acyrthosiphon Pisum* (Harris) and Green Peach Aphid *Myzus Persicae* (Sulzer)"; Polish Journal of Natural Sciences, 2006, No. 20(1); pp. 23-31.
Gabrys et al.; "Environmentally Safe Insect Control: Feeding Deterrent Activity of Alkyl-Substituted γ- and δ-Lactones to Peach Potato Aphid *(Myzus persicae* [Sulz.]) and Colorado Potato Beetle *(Leptinotarsa decemlineata* Say)", Polish Journal of Environmental Studies, vol. 15, No. 4, 2006, pp. 549-556.
Mosandl et al.; "Stereoisomeric Flavor Compounds. 20.1 Structure and Properties of γ-Lactone Enantiomers"; J. Agric. Food. Chem., 1989, 37, pp. 413-418.
Barsevškis et al"Elater ferrugineus Linnaeus 1758 (Coleoptera Elateridae)—a new species for the fauna of Latvia" Dec. 31, 2011 URL: https://www.reserachgate.net/profile/Arvds_Barsevskis/publication/236003007_Elater-ferrugineus_Linnaeus-1758-(Coleoptera-Elateridae)-a-new-species-for-the-fauna-of- Latvia.pdf (retrieved on Feb. 8, 2018.
Devanand Lakshmichand Luthria et al. "Insect Antifeedant Activity of Furochromones: Structure-Activity Relationships" Journal of Natural Products., vol. 56, No. 5 May 1, 1993 pp. 671-675, American Chemical Society, Washington, D.C. US.
Ômura et al. "Floral Scent of Osmathus fragrans Discourages Foraging Behavior of Cabbage Butterfly, Pieris rapae", Journal of Chemical Ecology, Mar. 1, 2000, pp. 655-666, Springer, New York, US.
Tian, et al. "Electroantennographic Responses and Field Attraction to Peach Fruit Odors in the Fruit-Piercing Moth, *Oraesia excavata* (Butler) (Lepidoptera:Noctuidae)", Applied Entomology and Zoology, vol. 43, No. 1 Jan. 1, 2008 pp. 265-269, Springer, US.
Noshita et al."Total Synthesis of Natural (+)-Phomopsolide B, an Antifeedant against Elm Bark Beetle", Bioscience Biotechnology Biochemiostry, vol. 58, No. 4 Jan. 1, 1994, pp. 740-744, Taylor and Francis, New York, US.
Extended European Search Report for the corresponding European application 17 18 0427.1, dated Feb. 28, 2018, 17 pages.
Nauen et al. "Thiamethoxam is a neonicotinoid precurser converted to clothianidin in insects and plants." Pesticide Biochemistry and Physiology, 2003, vol. 76 pp. 55-69.
Sheridan R.P. "The Most Common Chemical Replacements in Drug-Like Compounds" J. Chem. Inf. Comput. Sci., 2002, vol. 42, pp. 103-108.
EP Communication Pursuant to Article 94(3) EPC for the corresponding European application EP 13784833.9, dated Oct. 19, 2018, 5 pages.
Caprile et al"Codling Moth" Pest Notes, Publication 7412, May 2011, pp. 1-6, University of California Agriculture and Natural Resources.
Frears "Stink Bugs Migrating to the Deep South" Washington Post, Mar. 16, 2012.
"Granary Weevil Biology" http://www.pestmall.com/blog/pest-info/other-pests/granary-weevil-biology.

FEEDING DETERRENCE OF PESTS SUCH AS *HEMIPTERA*, *LEPIDOPTERA* AND *COLEOPTERA*

CROSS-REFERENCED APPLICATIONS

This application is a continuation-in-part of U.S. patent application Ser. No. 16/131,412, filed Sep. 14, 2018, which is a continuation of U.S. patent application Ser. No. 14/390,826, filed Oct. 6, 2014, which claims priority to international application PCT/US13/00120, filed Apr. 30, 2013, and U.S. Application Ser. No. 61/687,920, filed May 2, 2012, all of which are incorporated herein by reference.

BACKGROUND

1. Field of the Disclosure

This disclosure relates to the use of compounds as agents that deter feeding by pest arthropods such as *Hemiptera*, *Lepidoptera* and *Coleoptera* including, but not limited to, insect pests of the following genera: *Tineola, Sitotroga, Sitophilus, Cydia, Grapholita, Ostrinia, Plodia, Galleria, Manduca, Hyphantria, Lymantria, Agrotis, Trichoplusia, Spodoptera, Helicoverpa, Heliothis, Leptinotarsa, Popillia, Anthonomus, Crioceris, Oryzaephilus, Oulema, Stegobium, Agroites, Epilachna, Dermestes, Lygus, Blissus, Euschistus, Nezara, Homalodisca, Circulifer, Typhlocyba, Diaphorina, Bactericera, Bemisia, Trialeurodes, Myzus, Aphis, Macrosiphum, Eriosoma,* and *Dysaphis*.

2. Discussion of the Background Art

Lepidopteran, Coleopteran, and Hemipteran pests, including the genera: *Tineola, Sitotroga, Sitophilus, Cydia, Grapholita, Ostrinia, Plodia, Galleria, Manduca, Hyphantria, Lymantria, Agrotis, Trichoplusia, Spodoptera, Helicoverpa, Heliothis, Leptinotarsa, Popillia, Anthonomus, Crioceris, Oryzaephilus, Oulema, Stegobium, Agroites, Epilachna, Dermestes, Lygus, Blissus, Euschistus, Nezara, Homalodisca, Circulifer, Typhlocyba, Diaphorina, Bactericera, Bemisia, Trialeurodes, Myzus, Aphis, Macrosiphum, Eriosoma, Dysaphis,* are known to feed on various products of importance to humans. These products can include, for example, crops, forest trees and plants, ornamental plants, turf, and garden plants, or these products may be processed from plant or animal-based materials, such as seeds, processed grains, fibers, or woven fibers. Pest arthropods may damage these products at any stage of the product life, from in the field where they damage the leaves, stem, bark, or flowers of intact plants, to post harvest transport, storage or processing. The cost of this damage is extensive and leads to hardship among growers, manufacturers, warehouse managers, and to consumers.

Hemipteran pests include stink bugs, true bugs, aphids, whiteflies, psyllids, and others. In the Mid-Atlantic region, where brown marmorated stink bugs are well established, they caused an estimated $37 million in damage in apple crops alone in 2010, the most recent year for which data are available. [Darryl Fears, "Stink bugs migrating to deep south", Washington Post, Mar. 16, 2012]. Aside from apples, the bug will feed on nearly anything, including cherries, tomatoes, grapes, lima beans, soybeans, green peppers and peaches. Like brown marmorated stink bugs, *Euchistus* spp. and *Nezara* spp., bugs are significant pests of agricultural crops, notably cowpea, cotton, and soybean, are capable of significantly damaging these crops in tropical and subtropical regions. Aphids, including, but not limited to the genera *Myzus, Aphis, Macrosiphum, Eriosoma, Dysaphis*, can multiply rapidly through parthenogenesis where a single female foundress can produce hundreds of offspring. They are often cryptic pests, which are hard to detect, and vector several serious plant viruses, like barley yellow dwarf virus, cucumber mosaic virus, and potato virus. In addition to vectoring viruses to plants, the aphids also excrete honeydew a sugar-rich waste product, which promotes the growth of opportunistic fungi, like mildews. Similarly, whiteflies and psyllids are both serious pests of agriculture, both capable of transmitting viruses and bacterial pathogens. Whiteflies including the genera *Bemisia*, and *Trialeurodes*, are particularly damaging to tomatoes and greenhouse plants. Psyllids, including the genera *Diaphorina*, and *Bactericera*, can significantly affect agricultural crops. Such pests include the Asian citrus psyllid, a serious threat to the citrus industry because these insects vector causal agent of greening disease. This disease causes the trees to become unproductive, produce off-flavor fruit, and die prematurely.

Lepidopteran pests are often serious pests in crops, turf, ornamentals, stored products, fibers and even in beeswax production. The clothes moth, *Tineola* spp. is a major pest of wool and other natural fibers. The clothes moth can cause damage to products made from wool or other natural fibers, such as clothing, carpets, furniture, animal-hair bristles, and animal-fur clothing. In addition, this pest can also infest stored grains. Other serious Lepidopteran pests of stored grains and other processed food products include Indian meal moth and Angoumois grain moth.

Several lepidopteran pests pose serious threats to agricultural production, including species of the genera *Cydia, Grapholita, Ostrinia, Manduca, Hyphantria, Lymantria, Agrotis, Trichoplusia, Spodoptera, Helicoverpa,* and *Heliothis*. All of these juvenile insects feed on the plant tissues, potentially including stems, leaves and fruits, which cause direct and indirect crop losses in agricultural production or in gardening. *Ostrinia, Helicoverpa, Heliothis, Agrotis* and *Spodoptera* genera include the most serious Lepidopteran pest species of corn and other row crops. Species in the genera of *Hyphantria*, and *Lymantria* are the most serious Lepidopteran forest pests, often defoliated their host trees from feeding on the leaves during period of outbreak. *Manduca* spp. are specialist herbivores of Solanaceous plants, which include agriculturally important crops like tomato, eggplant, tobacco, peppers, and potato. *Trichoplusia* sp. are specialists, and these larva attach commercially important crops like cabbage and other brassica crops. Codling moth larvae penetrate into apples, pears, and nut crops and tunnel to the core, leaving holes in the fruit or nut that are filled with reddish-brown, crumbly droppings. If left uncontrolled, larvae can cause substantial damage, often infesting 20 to 90% of the fruit, depending on the variety and location. Late maturing varieties are more likely to suffer severe damage than early varieties. [J. L. Caprile and P. M. Vossen, *Pest Notes*: Codling Moth UC ANR Publication 7412, May 2011.

Phosmet, a phthalimide-derived, non-systemic, organophosphate insecticide is the primary means of controlling codling moth damage to apples. This material is on the U.S. Emergency Planning list of extremely hazardous substances and is highly toxic to bees. The materials covered in this disclosure would be a much gentler means of deterring the larvae and controlling moth infestation.

Coleopteran pests are beetles that can attack crops, stored products, and animal products. Dermestes beetles are a significant pest of dry-preserved animal collections, such as taxidermy or insect collections. Dermestes beetles consume the remaining flesh, hair, horn, ligaments, and other soft tissues. Toxic fumigants such as mothballs are typically used to control infestations. However, the active ingredient in mothballs is volatile, resulting in ineffectiveness and increased exposure to people who work or live in proximity to the application. Around food, mothballs are unacceptable, such as the case with Granary weevils, including *Oryzaephilus* spp. *Stegobium* spp., and *Sitophilus* spp. These beetles are attracted to and will attack all kinds of grains and grain products. These products will include such materials as wheat, corn, barley, or rice. In stored food products, they may be found in materials like macaroni or spaghetti. Adult weevils will feed on the same foods as the larvae. However, because they do not need to develop in the inside of whole grains like larvae do, they are not limited to just one grain or in other words, they are not restricted in their diets. [http://www.pestmall.com/blog/pest-info/other-pestsigranary-weevil-biology]

Some beetle pests attack hundreds of host plants, including crops, ornamentals, and garden plants, such as the case of pests like the Japanese beetle, a species of *Popillia*. The Japanese beetle is a serious pest in the North Eastern United States where it will swarm mid-summer, often defoliated plants with a characteristic pattern of holes in the leaves. Another beetle species, the Colorado potato beetle, in the genus *Leptinotarsa*, is a serious pest of tomato, potato, and egg plant where both the adult and larva will feed on the leaves, reducing the productivity of the plants. Leaf beetles, including *Crioceris*, *Oulema*, and *Epilachna* feed on the seeds of their respective host plants. These insects are pests of grains, asparagus, and beans respectively, reducing yield from these crops. Similarly, *Anthonomus* species, most notably boll weevil and strawberry weevil feed on the reproductive parts of the plants (e.g., cotton and strawberry, respectively), reducing the yields of these important crops.

Control of beetles is quite difficult as they live and breed in our food sources. Use of pyrethrins is an option, but food shouldn't be sprayed directly. Use of our materials may be sprayed directly on crops, seeds, agricultural or ornamental trees, plants, vegetation, produce or packaging materials so they provide a better alternative to traditional insecticides.

SUMMARY

In accordance with this disclosure, feeding deterrence by pests such as Hemipteran, Lepidopteran and Coleopteran, and other pests, is obtained by contact of the pests with at least one of the compounds of the structure (I)

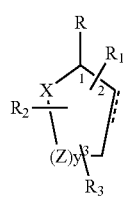

(I)

wherein:
R is selected from —OH, =O, —OC(O)$R_4$, —$OR_6$, and —$(OR_6)_2$, wherein each $R_6$ is independently selected from an alkyl group containing from 1 to 4 carbon atoms and $R_4$ is a branched or straight chain, saturated or unsaturated, hydrocarbyl group with zero to two double bonds and from 1 to 15 carbon atoms;

X is O or $CH_2$ with the proviso that when X is O, R can only be =O;
each Z is independently selected from (CH) and ($CH_2$);
y is a numeral selected from 1 and 2;
$R_1$ is selected from H or a branched or straight chain, saturated or unsaturated hydrocarbyl group with zero to two double bonds and from 1 to 15 carbon atoms;
$R_2$ is selected from H and a branched or straight chain, saturated or unsaturated hydrocarbyl group with zero to three double bonds and from 1 to 15 carbon atoms;
$R_3$ is selected from H, a branched or straight chain, saturated or unsaturated hydrocarbyl group with zero to three double bonds and from 1 to 15 carbon atoms, —$(CH_2)_n$OH, —C(O)$OR_5$, —$CH_2$C(O)$OR_7$, —$CH_2$C(O)$R_8$, —C(O)$NR_9R_{10}$, and —$CH_2$C(O)$NR_{11}R_{12}$ where each of $R_5$, $R_7$, $R_8$, $R_9$, $R_{10}$, $R_{11}$ and $R_{12}$ is independently selected from H and a branched or straight chain, saturated or unsaturated hydrocarbyl group with zero to three double bonds and from 1 to 15 carbon atoms and n is an integer of from 1 to 12;
the bond between the 2 and 3 positions in the ring structure may be a single or a double bond; and
wherein the compounds of structure (I) contain from 9 to 20 total carbon atoms in the compounds. The disclosure also includes optical isomers, diastereomers and enantiomers of the compounds of structure (I). Thus, at all stereocenters where stereochemistry is not explicitly defined, all possible epimers are envisioned.

The active feeding deterrence agents of this disclosure are an effective control agent against pests such as *Hemiptera*, *Lepidoptera* and *Coleoptera*. *Hemiptera*, sometimes differentiated into Heteroptera and homoptera, includes *Lygus*, *Blissus*, *Euschistus*, *Nezara*, *Homalodisca*, *Circulifer*, *Typhlocyba*, *Diaphorina*, *Bactericera*, *Bemisia*, *Trialeurodes*, *Myzus*, *Aphis*, *Macrosiphum*, *Eriosoma*, *Dysaphis*, and other genera. *Lepidoptera* includes butterflies and moths such as *Tineola*, *Sitotroga*, *Cydia*, *Grapholita*, *Ostrinia*, *Plodia*, *Galleria*, *Manduca*, *Hyphantria*, *Lymantria*, *Agrotis*, *Trichoplusia*, *Spodoptera*, *Helicoverpa*, *Heliothis*, and other genera. *Coleoptera* are beetles and the order contains *Leptinotarsa*, *Sitophilus*, *Popillia*, *Anthonomus*, *Crioceris*, *Oryzaephilus*, *Oulema*, *Stegobium*, *Agroites*, *Epilachna*, *Dermestes*, and other genera.

The feeding deterrence compounds of this disclosure, which could be applied directly to crops, seeds, agricultural or ornamental trees, plants, vegetation, produce or packaging materials for crops, or stored grains or fibers, have low mammalian toxicity and are similar to naturally occurring materials used in flavor/fragrance applications. Therefore, these provide a better method of control for farmers, manufacturers, transporters, storage facilities, and home owners. Additionally, the feeding deterrence compounds of this disclosure have the potential to be used on organic crops.

The compounds of structure (I) may be employed to deter feeding by pests, such as Hemipteran, Lepidopteran and Coleopteran, and other pests, which include, but are not limited to, *Tineola*, *Sitotroga*, *Sitophilus*, *Cydia*, *Grapholita*, *Ostrinia*, *Plodia*, *Galleria*, *Manduca*, *Hyphantria*, *Lymantria*, *Agrotis*, *Trichoplusia*, *Spodoptera*, *Helicoverpa*, *Heliothis*, *Leptinotarsa*, *Popillia*, *Anthonomus*, *Crioceris*, *Oryzaephilus*, *Oulema*, *Stegobium*, *Epilachna*, *Dermestes*, *Lygus*, *Blissus*, *Euschistus*, *Nezara*, *Homalodisca*, *Circulifer*, *Typhlocyba*, *Diaphorina*, *Bactericera*, *Bemisia*, *Trialeurodes*. *Myzus*, *Aphis*, *Macrosiphum*, *Eriosoma*, and *Dysaphis*. The active compounds of structure (I) may be employed in any suitable formulation, such as, but not limited to, direct spray formulations, fogger formulations, microencapsulated formulations, soil treatment formulations, seed treatment formulations, injectable formulations for injection into the plant, granular pellets, release devices, clay-based powders and formulations for use in evaporative devices.

DETAILED DESCRIPTION OF EMBODIMENTS

Figure 1:
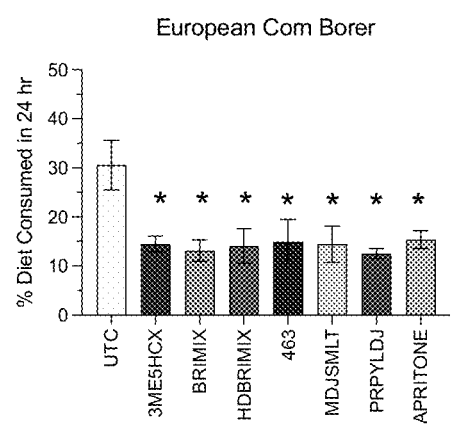
FIG. 1 graphically shows test results of the effects of certain test compounds on the larval feeding activity of European corn borer (*Ostrinia nubialis*), in accordance with the Examples.

Deterrence of feeding by pests, such as Hemipteran, Lepidopteran and Coleopteran, and other pests, including, but not limited to, *Tineola, Sitotroga, Sitophilus, Cydia, Grapholita, Ostrinia, Plodia, Galleria, Manduca, Hyphantria, Lymantria, Agrotis, Trichoplusia, Spodoptera, Helicoverpa, Heliothis, Leptinotarsa, Popillia, Ips, Anthonomus, Cyclas, Crioceris, Oryzaephilus, Oulema, Anoplophora, Stegobium, Agroites, Agrilus, Epilachna, Dermestes, Lygus, Blissus, Euschistus, Nezara, Homalodisca, Circulifer, Typhlocyba, Diaphorina, Bactericera, Bemisia, Trialeurodes, Myzus, Aphis, Macrosiphum, Eriosoma,* and *Dysaphis*, is obtained by contact of the pests with at least one of the compounds of the structure (I)

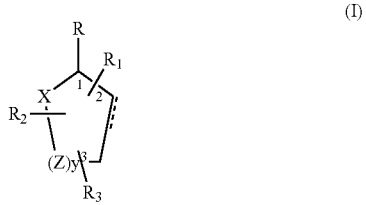

(I)

wherein
R is selected from —OH, =O, —OC(O)R$_4$, —OR$_6$, and —(OR$_6$)$_2$, wherein each R$_6$ is independently selected from an alkyl group containing from 1 to 4 carbon atoms and R$_4$ is a branched or straight chain, saturated or unsaturated hydrocarbyl group with zero to two double bonds and from 1 to 15 carbon atoms;

X is O or CH$_2$ with the proviso that when X is O, R can only be =O;
each Z is independently selected from (CH) and (CH$_2$);
y is a numeral selected from 1 and 2;
R$_1$ is selected from H or a branched or straight chain, saturated or unsaturated hydrocarbyl group with zero to two double bonds and from 1 to 15 carbon atoms;
R$_2$ is selected from H and a branched or straight chain, saturated or unsaturated hydrocarbyl group with zero to three double bonds and from 1 to 15 carbon atoms;
R$_3$ is selected from H, a branched or straight chain, saturated or unsaturated hydrocarbyl group with zero to three double bonds and from 1 to 15 carbon atoms —(CH$_2$)$_n$OH, —C(O)OR$_5$, —CH$_2$C(O)OR$_7$, —CH$_2$C(O)R$_8$, —C(O)NR$_9$R$_{10}$, and —CH$_2$C(O)NR$_{11}$R$_{12}$ where each of R$_5$, R$_7$, R$_8$, R$_9$, R$_{10}$, R$_{11}$ and R$_{12}$ is independently selected from H and a branched or straight chain, saturated or unsaturated hydrocarbyl group with zero to three double bonds and from 1 to 15 carbon atoms, and n is n integer of from 1 to 12;
the bond between the 2 and 3 positions in the ring structure may be a single or a double bond; and
wherein the compounds of structure (I) contain from 11 to 20 total carbon atoms in the compounds. The disclosure also includes optical isomers, diastereomers and enantiomers of the named structures. Thus, at all stereocenters where stereochemistry is not explicitly defined, all possible epimers are envisioned.

A preferred group of feeding deterrence compounds are those compounds of structure (I) wherein R is selected from —OH and =O, X is CH$_2$, y is 1 or 2, each Z is selected from (CH) and (CH$_2$), the bond between positions 2 and 3 in the ring is a single bond, one of R$_1$ and R$_2$ is H or —CH$_3$ and the other of R$_1$ and R$_2$ is a branched or straight chain, saturated or unsaturated hydrocarbyl group containing from 9 to 15 carbon atoms and 0 to 3 double bonds, and R$_3$ is H.

Another preferred group of feeding deterrence compounds are those compounds of structure (I) wherein R is selected from —OH and =O, more preferably =O, X is CH$_2$, y is 1 or 2, more preferably 1, each Z is selected from (CH) and (CH$_2$), the bond between positions 2 and 3 in the ring is a single or double bond, more preferably a single bond, one of R$_1$ and R$_2$ is H and the other of R$_1$ and R$_2$ is a branched or straight chain, saturated or unsaturated hydrocarbyl group containing from 9 to 15 carbon atoms and 0 to 3 double bonds, and R is selected from —C(O)OR$_5$ and —CH$_2$C(O)R$_8$ where R$_5$ and R$_8$ are each selected from a straight chain or branched, saturated or unsaturated hydrocarbyl group containing from 1 to 6 carbon atoms, and more preferably 3 to 5 carbon atoms and still more preferably —CH$_3$.

Another preferred group of feeding deterrence compounds are those compounds of structure (I) wherein R is =O, X is O, y is 1 or 2, each Z is selected from (CH) and (CH$_2$), the bond between positions 2 and 3 of the rings is a single or double bond, more preferably a single bond, one of R$_1$ and R$_2$ is H and the other of R$_1$ and R$_2$ is a branched or straight chain, saturated or unsaturated hydrocarbyl group containing from 9 to 15 carbon atoms and 0 to 3 double bonds, and R$_3$ is selected from —C(O)OR$_5$ and —CH$_2$C(O) R$_8$ where R$_5$ and R$_7$ are each selected from a hydrocarbyl group containing from 1 to 6 carbon atoms, and more preferably 3 to 5 carbon atoms and still more preferably-CH$_3$ and wherein the total number of carbon atoms in the compounds of structure (I) is from 9 to 20, more preferably from 9 to 14 total carbon atoms.

Another preferred group of feeding deterrence compounds are those compounds of structure (I) wherein R is =O, X is O, y is 1 or 2, each Z is selected from (CH) and (CH$_2$), the bond between positions 2 and 3 in the ring is a single bond, R$_1$ is a branched or straight chain, saturated or unsaturated alkyl group containing from 5 to 13 carbon atoms, R$_2$ is H or —CH$_3$, R$_3$ is H, and more preferably where R$_1$ is an alkyl group of from 5 to 10 carbon atoms such that the compound of structure (I) contains from 11 to 14 total carbon atoms.

The active compounds of structure (I) may be employed in any suitable formulation, such as, but not limited to, direct spray formulations, fogger formulations, microencapsulated formulations, soil treatment formulations, seed treatment formulations, injectable formulation for injection into the plant, granular pellets, release devices, clay-based powders, and formulations for use in evaporative devices. The formulations of the active compounds will be such that the areas or materials being treated will have from about 0.05 to about 500 mg/sq. in., preferably about 0.25 to about 50 mg/sq. in., of the active compounds thereon.

Representative examples of compounds of structure (I) include, but are not limited to,

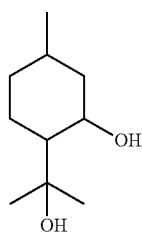

Cyclohexanementhanol, 2-hydroxy-a,a,4-trimethyl-
Chemical Formula: C$_{10}$H$_{20}$
Molecular Weight: 172.26
Para-Menthane-3, 8-Diol (PMD)

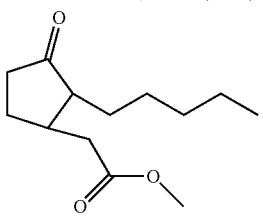

methyl 2-(3-oxo-2-pentylcyclopentyl)acetate
Chemical Formula: C$_{13}$H$_{20}$O$_3$
Molecular Weight: 226.31
Methyl Dihydro Jasmonate

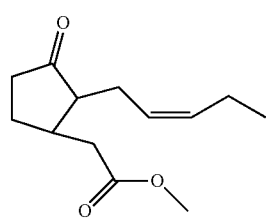

(Z)-methyl 2-(3-oxo-2-(pent-2-enyl)cyclopentyl)acetate
Chemical Formula: C$_{13}$H$_{20}$O$_3$
Molecular Weight: 224.30
Methyl Jasmonate

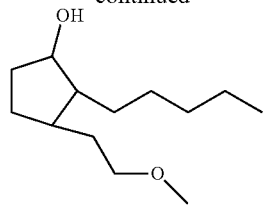

methyl 2-(3-hydroxy-2-pentylcyclopentyl)acetate
Chemical Formula: C$_{13}$H$_{24}$O$_3$
Molecular Weight: 228.33
Methyl Dihydro Jasmolate

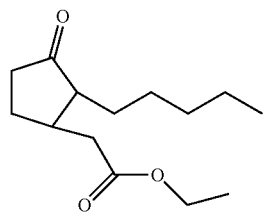

ethyl 2-(3-hydroxy-2-pentylcyclopentyl)acetate
Chemical Formula: C$_{14}$H$_{24}$O$_3$
Molecular Weight: 240.34
Ethyl Dihydro Jasmonate

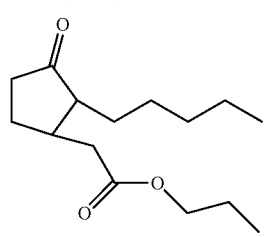

propyl 2-(3-oxo-2-pentylcyclopentyl)acetate
Chemical Formula: C$_{15}$H$_{26}$O$_3$
Molecular Weight: 254.37
Propyl Dihydro Jasmonate

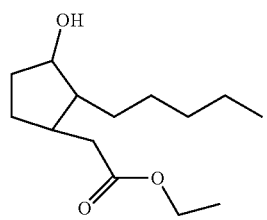

ethyl 2-(3-hydroxy-2-pentylcyclopentyl)acetate
Chemical Formula: C$_{14}$H$_{26}$O$_3$
Molecular Weight: 242.35
Ethyl Dihydro Jasmolate

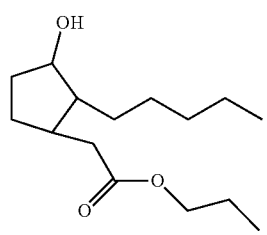

propyl 2-(3-hydroxy-2-pentylcyclopentyl)acetate
Chemical Formula: C$_{15}$H$_{28}$O$_3$
Molecular Weight: 256.38
Propyl Dihydro Jasmolate -continued

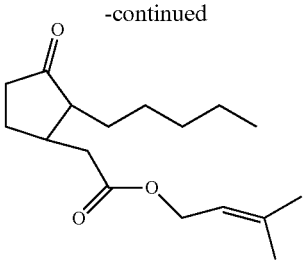

3-methylbut-2-enyl 2-(3-oxo-2-pentylcyclopentyl)acetate
Chemical Formula: $C_{17}H_{28}O_3$
Molecular Weight: 280.40
Prenyl Dihydro Jasmonate

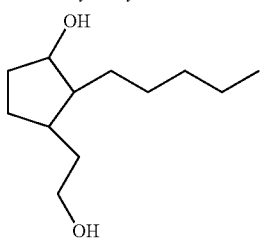

3-(2-hydroxyethyl)-2-pentycyclopentanol
Chemical Formula: $C_{12}H_{24}O_2$
Molecular Weight: 200.32
MethylDihydroJasmodiol

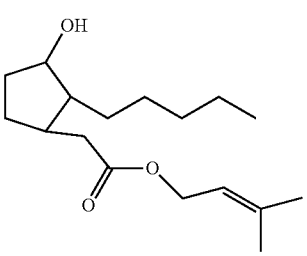

3-methylbut-2-eny 2l-(3-hyrdoxy-2-pentylcyclopentyl)acetate
Chemical Formula: $C_{17}H_{30}O_3$
Molecular Weight: 282.42
Prenyl Dihydro Jasmolate

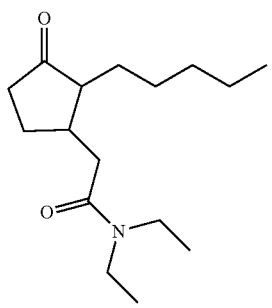

N, N-diethyl-2-(3-oxo-pentylcyclopentyl)acetamide
Chemical Formula: $C_{16}H_{29}NO_2$
Molecular Weight: 267.41
MDJ Amide -continued

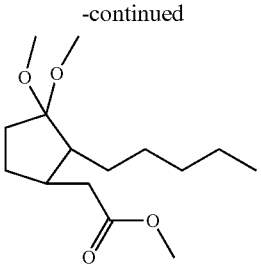

Methyl 2-(3-3-dimethoxy-2-pentylcyclopentyl)acetate
Chemical Formula: $C_{15}H_{28}O_4$
Molecular Weight: 272.38
Methyl Dihydro Jasmonate Dimethyl Ketal

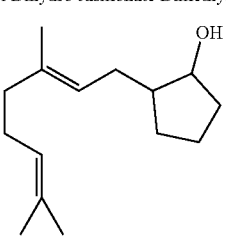

(E)-2-(3,7-dimethylocta-2,6-dienyl)cyclopentanal
Chemical Formula: $C_{15}H_{26}O$
Molecular Weight: 222.37
Apritol

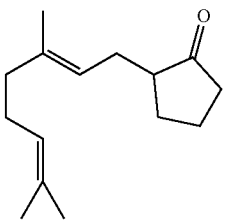

(E)-2-(3,7-dimethylocta-2,6-dienyl)cyclopentanone
Chemical Formula: $C_{15}H_{24}O$
Molecular Weight: 220.35
Apritone

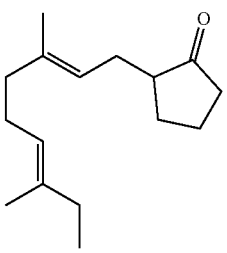

2-((2E,6E-3,7-dimethylnona-2,6-dienyl)cyclopentanone
Chemical Formula: $C_{16}H_{26}O$
Molecular Weight: 234.38
Methyl Apritone -continued

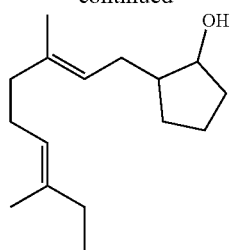

2-((2E,6E-3,7-dimethylnona-2,6-dienyl)cyclopentanol
Chemical Formular: $C_{16}H_{28}O$
Molecular Weight: 236.39
Methyl Apritol

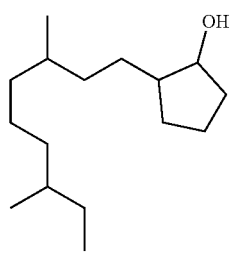

2-(3,7-dimethylnonyl)cyclopentanol
Chemical Formula: $C_{16}H_{32}O$
Molecular Weight: 240.42
Tetrahydromethyl Apritol

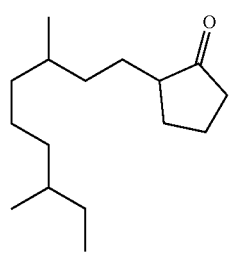

2-(3,7-dimethylnonyl)cyclopentanone
Chemical Formula: $C_{16}H_{30}O$
Molecular Weight: 238.41
Tetrahydromethyl Apritone

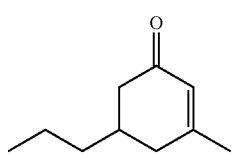

2-Cyclohexen-1-one,3-methyl-5-propyl-
Chemical Formula: $C_{10}H_{16}O$
Molecular Weight: 152.23

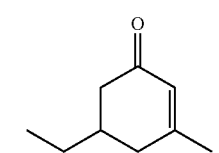

5-Ethyl-3-methyl-2-cyclohexenone
Chemical Formula: $C_9H_{14}O$
Molecular Weight: 138.21

-continued

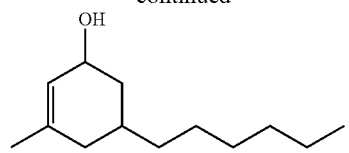

3-methyl-5-hexyl-2-cyclohexenol
Chemical Formula: $C_{14}H_{26}$
Molecular Weight: 194.36

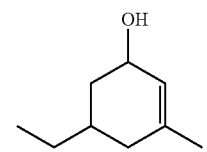

5-Ethyl-3-methyl-2-cyclohexen-1-ol
Chemical Formula: $C_9H_{16}O$
Molecular Weight: 140.22

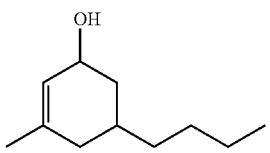

3-methyl-5-butyl-2-cyclohexenol
Chemical Formula: $C_{12}H_{22}$
Molecular Weight: 166.31

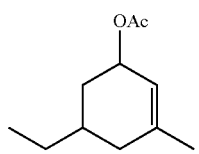

5-Ethyl-3-methyl-2-cyclohexen-1-yl Acetate
Chemical Fomula: $C_{11}H_{18}O_2$
Molecular Weight: 182.26

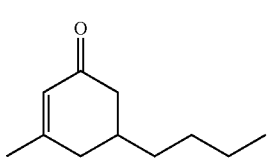

3-methyl-5-butyl-2-cyclohexenone
Chemical Fomula: $C_{11}H_{18}O$
Molecular Weight: 166.26

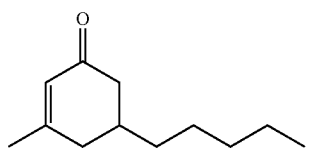

3-methyl-5-pentyl-2-cyclohexenone
Chemical Formula: $C_{12}H_{20}O$
Molecular Weight: 180.29

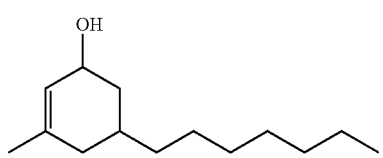

3-methyl-5-heptyl-2-cyclohexen-1-ol
Chemical Formula: $C_{14}H_{26}O$
Molecular Weight: 210.36

-continued

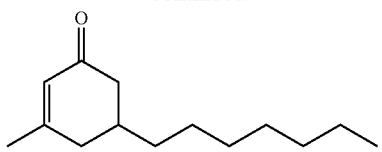

3-methyl-5-heptyl-2-cyclohexenone
Chemical Formula: $C_{14}H_{24}O$
Molecular Weight: 208.34

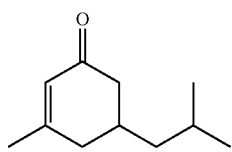

3-methyl-5-isobutyl-2-cyclohexenone
Chemical Formula: $C_{11}H_{18}O$
Molecular Weight: 166.26

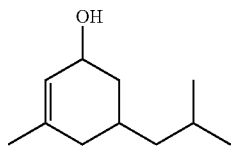

3-methyl-5-isobutyl-2-cyclohexen-1-ol
Chemical Formula: $C_{11}H_{20}O$
Molecular Weight: 168.28

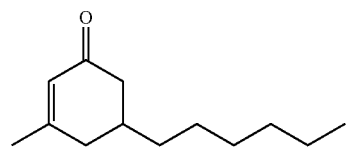

3-methyl-5-hexyl-2-cyclohexenone
Chemical Formula: $C_{13}H_{22}O$
Molecular Weight: 194.31

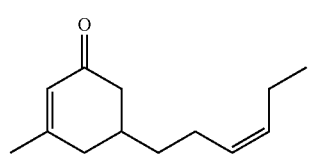

3-methyl-5-(z-hexenyl)-2-cyclohexenone
Chemical Formula: $C_{13}H_{20}O$
Molecular Weight: 192.30

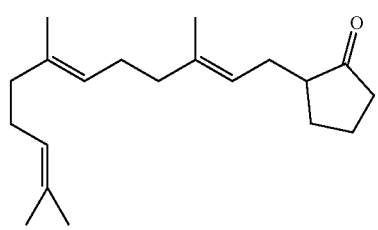

2-((2E, 6E)-3,7,11-trimethyldodeca-2,6,10-trienyl)cyclopentanone
Chemical Formula: $C_{20}H_{32}O$
Molecular Weight: 288.47
Farnesylcyclopentanone -continued

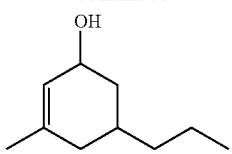

3-methyl-5-propyl-2-cyclohexen-1-ol
Chemical Formula: $C_{10}H_{18}O$
Molecular Weight: 154.25

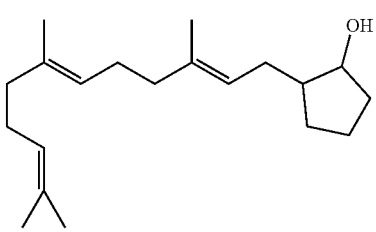

2-((2E,6E)-3,7,11-trimethyldodeca-2,6,10-trienyl)cyclopentanol
Chemical Formula: $C_{20}H_{34}O$
Molecular Weight: 290.48
Farnesylcyclopentanol

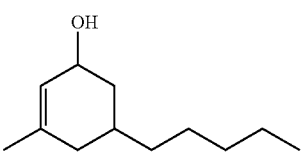

3-methyl-5-pentyl-2-cyclohexen-1-ol
Chemical Formula: $C_{12}H_{22}O$
Molecular Weight: 182.30

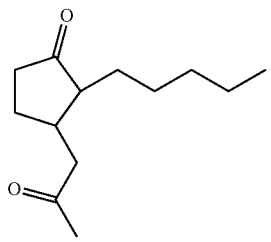

3-(2-oxopropyl)-2-pentylcyclopentanone
Chemical Formula: $C_{13}H_{22}O_2$
Molecular Weight: 210.31
Amyl Cyclopentanone Propanone

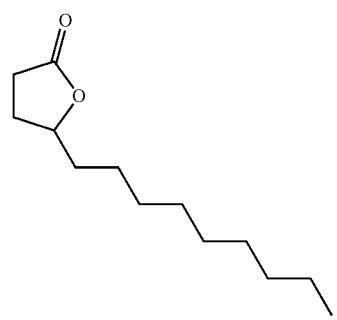

5-nonyldihydrofuran-2(3H)-one
Chemical Formula: $C_{13}H_{24}O_2$
Molecular Weight: 212.33
Gamma-Tridecalactone -continued

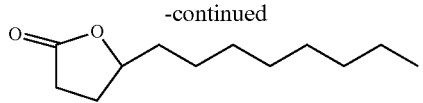

5-octyldihydrofuran-2(3H)-one
Chemical Formula: $C_{12}H_{22}O_2$
Molecular Weight: 198.30
Gamma-dodecalactone

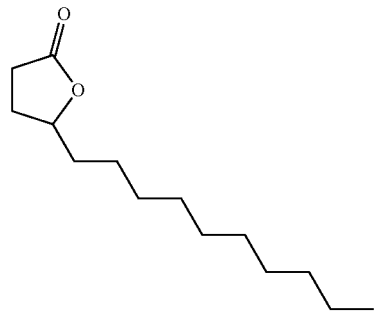

5-decyldihydrofuran-2(3H)-one
Chemical Formula: $C_{14}H_{26}O_2$
Molecular Weight: 226.36
Gamma-Tetradecalactone

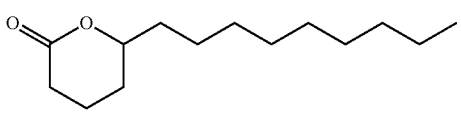

5-nonyltetrahydrofuran-2H-pyran-2-one
Chemical Formula: $C_{14}H_{26}O_2$
Molecular Weight: 226.36
Delta-Tetradecalactone

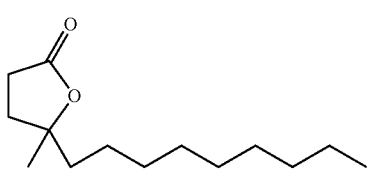

Gamma Methyl Tridecalcatone
Chemical Formula: $C_{12}H_{26}O_2$
Molecular Weight: 202.34
5-methyl-5-nonyldihydrofuran-2(3H)-one
4-methyl-4-nonyl gamma butyrolactone C14 lactone

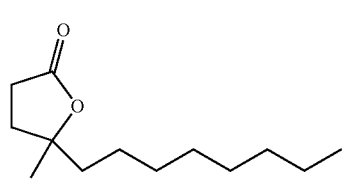

Gamma Methyl Dodecalactone
Chemical Formula: $C_{13}H_{24}O_2$
Molecular Weight: 212.33
2(3H)-Furanone, 5-octyldihydro-5-methyl -continued

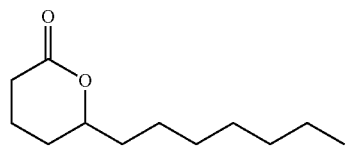

Delta Dodecalactone
6-heptyltetrahydro-2H-pyran-2-one
Chemical Formula: $C_{12}H_{22}O_2$
Molecular Weight: 198.31

Preferred compounds of structure (I) include apritone, methyl apritone, methyl dihydrojasmonate, methyl dihydrojasmolate, propyl dihydrojasmonate, gamma-dodecalactone, gamma-tridecalactone, gamma methyl dodecalactone, delta dodecalactone, gamma methyl tridecalactone, 3-methyl-5-propyl-2-cyclohexenone, 3-methyl-5-isobutyl-2-cyclohexenone, 3-methyl-5-isobutyl-2-cyclohexenol, 3-methyl-5-pentyl-2-cyclohexenone, 3-methyl-5-hexyl-2-cyclohexenone, and 3-methyl-5-heptyl-2-cyclohexenone.

A test was designed to measure the repellency as feeding deterrence in brown marmorated stink bugs (BMSB). Five replicates of 5 BMSBs were introduced into test arenas, containing one 60 mm×15 mm Petri dish with treated filter papers in which a food source (green bean) was attached, at the start of the test. The small Petri dishes containing the treated filter paper and food source were covered with a fitted Petri dish lid in between observation times, and were removed 5 minutes before each observation time to prevent stink bugs from feeding until sated. The distribution of the BMSBs was observed and documented hourly for 5 hours. The results are set forth in Table 1.

TABLE 1

| Compound in a 57% Ethanol:43% water solution | Repellency averaged over 5 hours |
| --- | --- |
| Control (57% Ethanol:43% water solution) | 38% |
| Methyl Dihydrojasmonate (3.5%) | 90% |
| Methyl Dihydrojasmonate - Low epi (2.5%) | 58% |
| Methyl Dihydrojasmonate - High epi (2.5%) | 39% |
| Propyl Dihydrojasmonate (3.5%) | 100% |
| Propyl Dihydrojasmonate - Low epi (2.5%) | 74% |
| Propyl Dihydrojasmonate - High epi (2.5%) | 49% |
| Para-Menthanediol (3.5%) | 91% |
| Gamma-Dodecalactone (3.5%) | 82% |
| Gamma-Methyl Tridecalactone (3.5%) | 67% |

Another test was designed to measure the repellency as feeding deterrence in Codling Moth larvae. The treatment was applied to the surface of a proprietary laboratory media in a tray with wells for each compound. The media was allowed to dry for 30-60 minutes so that larvae were not exposed to it as a liquid. One first instar codling moth larva was then placed on the treated media. The cover film was placed on the tray to prevent escapes. Ten additional replicates treated with a 57% ethanol solution were prepared to serve as controls. The larvae were observed at 24 hours to determine if they burrowed into the media. After the 24 hour reading, the larvae were extracted from the media to record any mortality. The results are set forth in Table 2.

TABLE 2

| Compound at 3.5% in a 57% Ethanol:43% water solution | Repellency at 24 hours |
|---|---|
| Control (57% Ethanol:43% water solution) | 8% |
| Para-Menthanediol | 10% |
| Propyl Dihydrojasmonate | 59% |
| Prenyl Dihydrojasmonate | 79% |
| Gamma-Dodecalactone | 46% |
| Methyl Apritone | 100% |
| 3-Methyl-5-Propyl-2-Cyclohexenone | 21% |
| 3-Methyl-5-Propyl-2-Cyclohexenol | 30% |
| 3-Methyl-5-Heptyl-2-Cyclohexenone | 95% |

Mortality observations were also made for the above protocol. The control was the 57% ethanol:43% water solution. The results are set forth in Table 3.

TABLE 3

| Compound at 3.5% in a 57% Ethanol:43% water solution | Increased Mortality over Control Mortality at 24 hours |
|---|---|
| Para-Menthanediol | 3% |
| Propyl Dihydrojasmonate | 18% |
| Prenyl Dihydrojasmonate | 34% |
| Gamma-Dodecalactone | 37% |
| Methyl Apritone | 95% |
| 3-Methyl-5-Propyl-2-Cyclohexenone | 1% |
| 3-Methyl-5-Propyl-2-Cyclohexenol | 9% |
| 3-Methyl-5-Heptyl-2-Cyclohexenone | 93% |

Ten replicates of 30 kernels of wheat were immersed into the test compound and allowed to dry for 24 hours. The grains were then transferred to a test container, and 10 granary weevils were released. Test containers were secured and left for a 3 week period. At the end of this time, the wheat grains were examined for developing larvae and damage by larvae. The number of grains that contained developing larvae or that showed damage was recorded. Ten additional replicates treated with isopropyl alcohol were prepared to serve as controls. The results are set forth in Table 4.

TABLE 4

| Test compound, diluted in isopropyl alcohol | Increased Repellency vs. Control Repellency | Increased Mortality over Control Mortality |
|---|---|---|
| Methyl Apritone (5%) | 11% | N/A |
| Propyl Dihydrojasmonate (5%) | 8% | N/A |
| Gamma Tridecalactone (5%) | 40% | N/A |
| 3-Methyl-5-Propyl-2-Cyclohexenone (5%) | 66% | 57% |
| 3-Methyl-5-Isobutyl-2-Cyclohexenol (5%) | 86% | 93% |

Effects of Formulations of this Disclosure (BRI) on the Feeding Activity of Agricultural Pest Insects The effects of celery ketone (3ME5HCS), BRIMIX (PBRMIX01), high delta (KDBRIMIX), delta dodecalactone (463), methyl dihydro jasmolate (MDJSMLT), propyl dihydro jasmonate (PRPYLDJ), and apritone (499) on the larval feeding activity of European corn borer (*Ostrinia mibialis*), fall armyworm (*Spodoptera frugiperda*), and black cutworm (*Agrotis ipsilon*) was examined by exposing the larvae to an artificial diet treated (100% solution undiluted), or untreated (control), with the BRI formulations. Each of the 8 treatment groups consisted of 4 replicates of 6 third-instar larvae for each insect (24 larvae per treatment per species). Larvae were provided the treated and untreated artificial diet for 24 h. Following the exposure period, the total weight of treated or untreated artificial diet consumed was recorded to the nearest milligram and subtracted from the total weight of each artificial diet at the start of the experiments. Statistical analysis of differences in artificial diet consumption based on treatment was conducted using a one-way analysis of variance and Dunnett's multiple comparison test. All calculations and statistical analysis were conducted using GraphPad Prism 8 at a significance level (a) of 0.05.

Bars represent mean diet consumed (%)±standard deviation (n=4). Asterisks indicate a significant difference between the formulation treatment and the respective untreated control based on a one-way analysis of variance and Dunnett's multiple comparison test where $P<0.05$ was considered significant.

Test results showing the effects of celery ketone (3ME5HCX), BRIMIX (PBRMIX01), high delta (KDBRIMIX), delta dodecalactone (463), methyl dihydro jasmolate (MDJSMLT), propyl dihydro jasmonate (PRPYLDJ), and apritone (499) on the larval feeding activity of European corn borer (*Ostrinia nubialis*) are graphically shown in FIG. 1.

Figure 2:
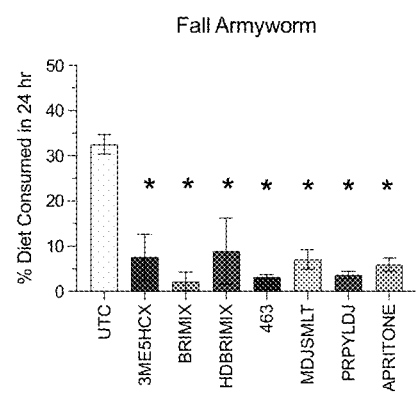
FIG. 2 graphically shows test results of the effects of certain test compounds on the larval feeding activity of fall armyworm (*Spodoptera frugiperda*), in accordance with the Examples.

Test results showing the effects of celery ketone (3ME5HCX), BRIMIX (PBRMIX01), high delta (KDBRIMIX), delta dodecalactone (463), methyl dihydro jasmolate (MDJSMLT), propyl dihydro jasmonate (PRPYLDJ), and apritone (499) on the larval feeding activity of fall armyworm (*Spodoptera frugiperda*) are graphically shown in FIG. 2.

Figure 3:
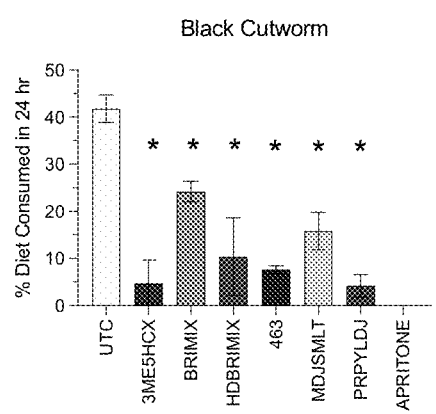
FIG. 3 graphically shows test results of the effects of certain test compounds on the larval feeding activity of black cutworm (*Agrotis ipsilon*) in accordance with the Examples.

Test results showing the effects of celery ketone (3ME5HCX), BRIMIX (PBRMIX01), high delta (KDBRIMIX), delta dodecalactone (463), methyl dihydro jasmolate (MDJSMLT), propyl dihydro jasmonate (PRPYLDJ), and apritone (499) on the larval feeding activity of black cutworm (*Agrotis ipsilon*) are graphically shown in FIG. 3.

Behavioral assays were conducted within an arena consisting of a 20×20×20 cm mesh cage. The cage borders were covered by non-reflective white screen to remove any potential visual cues. A single light was disposed above the arena. With a luxmeter, the luminosity was checked and it did not vary significantly in the different portions of the arena. Two plants (either a citrus branches or potted tomato) were placed 15 cm apart on each end of the arena. The experimental insects (whiteflies, Asian citrus psyllid or winged aphids) were collected by a mouth aspirator in a plastic vial. The vial was placed in the center of the arena at equal distance from each experimental plant. The vial was open and the insects were allowed to select the plant for 24 hours. After 24 hours, the insects were counted on each plant by the experimenter.

Repellency of Test Compounds Against Whitefly Settling

Figure 4:
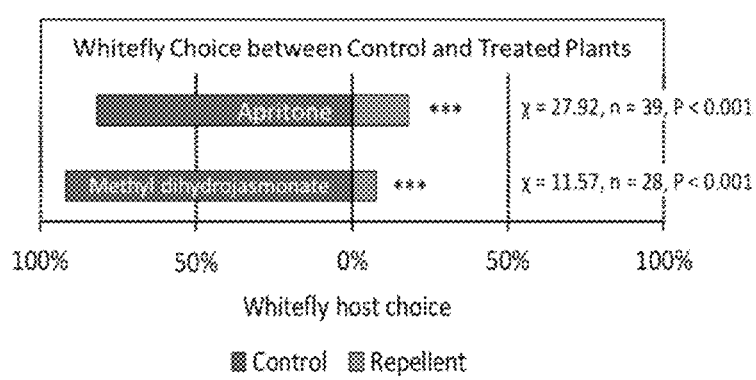
FIG. 4 graphically shows test results for repellency of certain test compounds against whitefly settling, in accordance with the Examples.

Forty whiteflies were placed in an arena with two tomato plants. Whitefly were allowed to choose between a tomato plant sprayed with a solution of 1% repellent chemical+tween 20 (1:1 ratio) in distilled water, and a control plant sprayed with of a solution of 1% tween 20 only. The results are graphically shown in FIG. 4.

Figure 5:
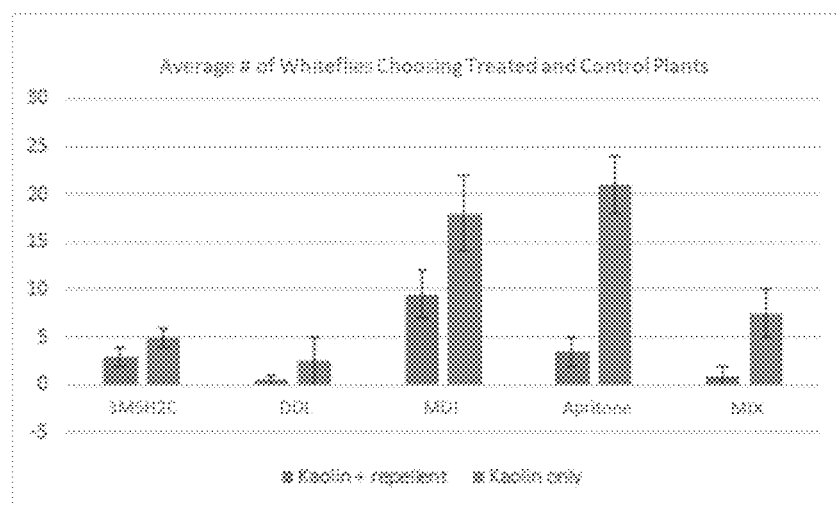
FIG. 5 graphically shows test results for repellency of certain test compounds against whitefly settling, in accordance with the Examples.

Forty whiteflies were placed in an arena with two tomato plants. Whiteflies were allowed to choose between a tomato plant treated with 0.5% repellent chemical in a carrier of kaolin clay. (3M5H2C=3-methyl-5-hexyl-2-cyclohexanone, DDL=delta dodecalactone, MDJ=Methyl dihydrojasmonate, Apritone=Apritone, Mix=mixture of delta dodecalactone, methyl dihydrojasmolate, propyl dihydrojasmonate). The results are graphically shown in FIG. 5.

Repellency of Test Compounds Against Aphid Settling

Figure 6:
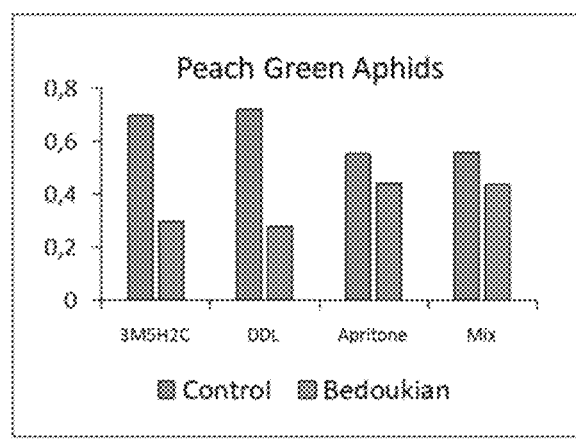
FIG. 6 graphically shows test results for repellency of certain test compounds against aphid settling, in accordance with the Examples.

Forty aphids were placed in an arena with two tomato plants. The aphids were allowed to choose between a tomato plant sprayed with a solution of 1% repellent chemical+ tween 20 (1:1 ratio) in distilled water, and a control plant sprayed with of a solution of 1% tween 20 only. (3M5H2C=3-methyl-5-hexyl-2-cyclohexanone, DDL=delta dodecalactone, Apritone=Apritone, Mix=mixture of delta dodecalactone, methyl dihydrojasmolate, propyl dihydrojasmonate). The results are graphically shown in FIG. 6.

Repellency of Test Compounds Against Psyllid Settling

Figure 7:
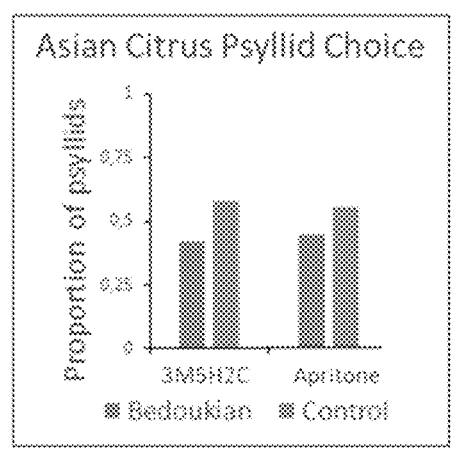
FIG. 7 graphically shows test results for repellency of certain test compounds against psyllid settling, in accordance with the Examples.

Forty Asian citrus psyllids were placed in an arena with two citrus cuttings. The psyllid were allowed to choose between a citrus cutting sprayed with a solution of 1% repellent chemical+tween 20 (1:1 ratio) in distilled water, and a control cutting sprayed with of a solution of 1% tween 20 only. (3M5H2C=3-methyl-5-hexyl-2-cyclohexanone, Apritone=Apritone). The results are graphically shown in FIG. 7.

Melon Aphid Repellency on Leaf Choice Assays

*Aphis gossypii* are maintained on squash plants. Individual aphids (n=100) are given the choice between leaves with and without repellent treatments. A separate group of aphids are given a choice between untreated vs. untreated leaves as a control. The number of aphids choosing each leaf is counted both choice tests. The number of aphids choosing each treatment is compared to the control to determine the repellent effect. The results are set forth in Table 5.

TABLE 5

| Treatments vs Control | Number of Aphids Choosing each Treatment | |
|---|---|---|
| 3% Compound in a Triton X:Water solution | Untreated | Treated |
| Control (Triton X:water solution) | 50 | 50 |
| Apritone | 70 | 30 |
| Methyl Apritone | 70 | 30 |
| Apritol | 70 | 30 |
| Methyl dihydrojasmolate | 70 | 30 |
| Methyl dihydrojasmonate | 70 | 30 |
| Propyl dihydrojasmonate | 70 | 30 |
| 3-methyl-5-hexyl-2-cyclohexanone | 70 | 30 |
| Gamma Tridecalactone | 80 | 20 |
| Delta-dodecalactone | 80 | 20 |

Psyllid Repellency on Potato Choice Assays

Potato plants are sprayed with either a 3% solution of repellent chemical in a 5%:95% ETOH:Water or only 5%:95% ETOH:Water as a control. Two plants are placed in a screen cage, either a treatment vs control tree or a control vs control tree, 100 psyllids are released into each cage. The number of psyllids choosing each leaf is counted for both choice tests. The number of psyllids choosing each treatment is compared to the control to determine if there is a repellent effect. The results are set forth in Table 6.

TABLE 6

| Treatments vs Control | Number of Psyllids Choosing each Treatment | |
|---|---|---|
| 3% Compound in a Triton X:Water solution | Untreated | Treated |
| Control (Triton X:water solution) | 50 | 50 |
| Apritone | 70 | 30 |
| Methyl Apritone | 70 | 30 |
| Apritol | 70 | 30 |
| Methyl dihydrojasmolate | 70 | 30 |
| Methyl dihydrojasmonate | 70 | 30 |
| Propyl dihydrojasmonate | 70 | 30 |
| 3-methyl-5-hexyl-2-cyclohexanone | 70 | 30 |

TABLE 6-continued

| Treatments vs Control | Number of Psyllids Choosing each Treatment | |
|---|---|---|
| Gamma Tridecalactone | 80 | 20 |
| Delta-dodecalactone | 80 | 20 |

Leafhopper Repellency on Citrus Choice Assays

Citrus seedlings are sprayed with either a 3% solution of repellent chemical in a 5%:95% ETOH:Water or only 5%:95% ETOH:Water as a control. Two seedlings are placed in a screen cage, either a treatment vs control tree or a control vs control tree. 100 sharpshooters are released into each cage. The number of sharpshooters choosing each leaf is counted for both choice tests. The number of sharpshooters choosing each treatment is compared to the control to determine if there is a repellent effect. The results are set forth in Table 7.

TABLE 7

| Treatments vs Control | Number of Psyllids Choosing each Treatment | |
|---|---|---|
| 3% Compound in a Triton X:Water solution | Untreated | Treated |
| Control (Triton X:water solution) | 50 | 50 |
| Apritone | 70 | 30 |
| Methyl Apritone | 70 | 30 |
| Apritol | 70 | 30 |
| Methyl dihydrojasmolate | 70 | 30 |
| Methyl dihydrojasmonate | 70 | 30 |
| Propyl dihydrojasmonate | 70 | 30 |
| 3-methyl-5-hexyl-2-cyclohexanone | 70 | 30 |
| Gamma Tridecalactone | 80 | 20 |
| Delta-dodecalactone | 80 | 20 |

To compare the feeding/resting preference of stink bug adults for different plant parts, 10 pots with soybean plants at the $R_6$ (pod-filling) stage of development are used. 5 pots of soybeans are sprayed with 3% of treatment in a 2% Triton X:water solution and 5 pots of soybean are treated with 2% Triton X:water solution as controls. Thirty stink bugs are placed individually in each cage and allowed to feed for 48 hours. Insects are removed and plant parts are collected for visual analysis of damage. Feeding damage on the pods is counted for both treatments. The selective antifeeding rate (%) formula is $[(C-T)/(C+T)] \times 100$, and the non-selective antifeeding rate (%) formula is $[(C-T)/C] \times 100$, where C and T are the numbers of feeding damages on the control and treated plant pods, respectively. The results are set forth in Table 8.

TABLE 8

*Euschistus heros*-Neotropical Brown Stink Bugs

| 3% Compound in a 5% Ethanol:95% water solution | % Antifeedent Activity |
|---|---|
| Control (Triton X:water solution) | 0 |
| Apritone | 60 |
| Methyl Apritone | 60 |
| Apritol | 60 |
| Methyl dihydrojasmolate | 90 |
| Methyl dihydrojasmonate | 90 |
| Propyl dihydrojasmonate | 100 |
| 3-methyl-5-hexyl-2-cyclohexanone | 60 |
| Gamma Tridecalactone | 80 |
| Delta-dodecalactone | 80 |

For choice feeding assays, 3% alcohol solutions of the tested compounds are prepared. Disks (4.0 cm in diameter)

are cut from potato leaves and are dipped in the test solutions or alcohol alone as a control. After the complete evaporation of the solvent, the disks are offered to 10 larvae. Control and treated disks are placed at alternate corners in Petri dishes (150 by 20 mm) lined with moistened filter paper (choice test). All dishes are placed in an incubator. Four replicates and 40 larva are used for each chemical. In each replicate, the insects are allowed to feed ad libitum for 24 h at 24 C under a 16:8 (L:D) photoperiod. After 24 h, the remaining uneaten area of each potato leaf disk is measured using a scanner and software. The selective antifeeding rate (%) formula is [(C−T)/(C+T)]×100, and the non-selective antifeeding rate (%) formula is [(C−T)/C)]×100, where C and T are the areas consumed by the control and treated leaf disks, respectively. The results are set forth in Table 9.

TABLE 9

Leptinotarsa decemlineata-Colorado Potatoe Beetles

| 3% Compound in a 5% Ethanol:95% water solution | % Repellency |
|---|---|
| Control (Triton X:water solution) | 0 |
| Apritone | 15 |
| Methyl Apritone | 15 |
| Apritol | 15 |
| Methyl dihydrojasmolate | 15 |
| Methyl dihydrojasmonate | 15 |
| Propyl dihydrojasmonate | 15 |
| 3-methyl-5-hexyl-2-cyclohexanone | 80 |
| Gamma Tridecalactone | 40 |
| Delta-dodecalactone | 40 |

Japanese Beetle Feeding Damage on Basil

For choice feeding assays, 3% alcohol solutions of the tested compounds are prepared. Disks (4.0 cm in diameter) are cut from basil leaves and are dipped in the test solutions or alcohol alone as a control. After the complete evaporation of the solvent, the disks are offered to 1 adult beetle. All dishes are placed in an incubator. Four replicates are used for each chemical. After 24 h, the remaining uneaten area of each basil leaf disk is measured using a scanner and software. The selective antifeeding rate (%) formula is [(C−T)/(C+T)]×100, and the non-selective antifeeding rate (%) formula is [(C−T)/C)]×100, where C and T are the areas consumed by the control and treated leaf disks, respectively. The results are set forth in Table 10.

TABLE 10

Popillia japonica

| 3% Compound in a 5% Ethanol:95% water solution | % Repellency |
|---|---|
| Control (Triton X:water solution) | 0 |
| Apritone | 15 |
| Methyl Apritone | 15 |
| Apritol | 15 |
| Methyl dihydrojasmolate | 15 |
| Methyl dihydrojasmonate | 15 |
| Propyl dihydrojasmonate | 15 |
| 3-methyl-5-hexyl-2-cyclohexanone | 80 |
| Gamma Tridecalactone | 40 |
| Delta-dodecalactone | 40 |

Dermestid Beetle Feeding Damage on Silk Fabric

For feeding assays, 3% alcohol solutions of the tested compounds are prepared. Disks (4.0 cm in diameter) of undyed silk fabric are dipped in the test solutions or alcohol alone as a control. After the complete evaporation of the solvent, the disks are offered to 10 late instar larvae. All dishes are placed in an incubator. Four replicates are used for each chemical. After 1 week, the remaining uneaten area of each silk disk is measured using a scanner and software. The selective antifeeding rate (%) formula is [(C−T)/(C+T)]×100, and the non-selective antifeeding rate (%) formula is [(C−T)/C)]×100, where C and T are the areas consumed by the control and treated silk disks, respectively. The results are set forth in Table 11.

TABLE 11

Dermestid spp.

| 3% Compound in a 5% Ethanol:95% water solution | % Repellency |
|---|---|
| Control (Triton X:water solution) | 0 |
| Apritone | 15 |
| Methyl Apritone | 15 |
| Apritol | 15 |
| Methyl dihydrojasmolate | 15 |
| Methyl dihydrojasmonate | 15 |
| Propyl dihydrojasmonate | 15 |
| 3-methyl-5-hexyl-2-cyclohexanone | 80 |
| Gamma Tridecalactone | 40 |
| Delta-dodecalactone | 40 |

Ten replicates of 30 kernels of corn are immersed into the test compound and allowed to dry for 24 hours. The kernels are then transferred to a test container, and 10 saw tooth grain beetles are released. Test containers are secured and left for a 3 week period. At the end of this time, the wheat grains are examined for feeding damage. The number of grains that showed damage is recorded. Ten additional replicates treated with isopropyl alcohol are prepared to serve as controls. The results are set forth in Table 12.

TABLE 12

Repellency of Test Compounds on Grain Beetles

| Test compound, diluted in isopropyl alcohol | Increased Repellency vs. Control Repellency |
|---|---|
| Methyl Apritone (5%) | 10% |
| Propyl Dihydrojasmonate (5%) | 10% |
| Gamma Tridecalactone (5%) | 40% |
| 3-Methyl-5-Propyl-2-Cyclohexenone (5%) | 60% |
| 3-Methyl-5-Isobutyl-2-Cyclohexenol (5%) | 85% |

For feeding assays, 3% alcohol solutions of the tested compounds are prepared. Disks (2.0 cm in diameter) of undyed silk fabric are dipped in the test solutions or alcohol alone as a control. After the complete evaporation of the solvent, the disks are presented in a choice test to 10 late instar Tineola spp. larvae. All dishes are placed in an incubator in the dark. Four replicates are used for each chemical. After 24 hours, the number of individuals choosing to feed on each disk are counted. The results are set forth in Table 13.

TABLE 13

Clothes Moth Feeding Damage on Silk Fabric
Tineola spp.

| 3% Compound in a 5% Ethanol:95% water solution | Untreated | Treated |
|---|---|---|
| Control (Triton X:water solution) | 50 | 50 |
| Apritone | 80 | 20 |
| Methyl Apritone | 80 | 20 |
| Apritol | 80 | 20 |
| Methyl dihydrojasmolate | 80 | 20 |
| Methyl dihydrojasmonate | 80 | 20 |

TABLE 13-continued

Clothes Moth Feeding Damage on Silk Fabric
Tineola spp.

| 3% Compound in a 5% Ethanol:95% water solution | Untreated | Treated |
|---|---|---|
| Propyl dihydrojasmonate | 80 | 20 |
| 3-methyl-5-hexyl-2-cyclohexanone | 80 | 20 |
| Gamma Tridecalactone | 90 | 10 |
| Delta-dodecalactone | 90 | 10 |

Feeding Repellent Assay for Indian Meal Moth Larva

One gram of rice is weighed and treated with 2% by weight of each test chemical or ethanol as a control for each treatment and replicate. The grains are allowed to dry and then weighed again. Treated or control rice grains are placed in a petri dish. Third instar larvae are starved for 8 h and gently introduced into the center of each compartment. 20 larva are screened per treatment, and each experiment is repeated three times. The weight of rice grains is measured again after 1 week. The selective antifeeding rate (%) formula is [(C−T)/(C+T)]×100, and the non-selective antifeeding rate (%) formula is [(C−T)/C]×100, where C and T are the areas consumed by the control and treated leaf disks, respectively. The results are set forth in Table 14.

TABLE 14

Plodia interpunctella

| 10% Compound in a 5% Ethanol:95% water solution | % Antifeedent Activity |
|---|---|
| Control (Triton X:water solution) | 0 |
| Apritone | 70 |
| Methyl Apritone | 70 |
| Apritol | 70 |
| Methyl dihydrojasmolate | 60 |
| Methyl dihydrojasmonate | 60 |
| Propyl dihydrojasmonate | 60 |
| 3-methyl-5-hexyl-2-cyclohexanone | 60 |
| Gamma Tridecalactone | 70 |
| Delta-dodecalactone | 70 |

Feeding Repellent Assay for Angoumois Larva

One gram of rice is weighed and treated with 2% by weight of each test chemical or ethanol as a control for each treatment and replicate. The grains are allowed to dry and then weighed again. Treated or control rice grains are placed in a petri dish. Third instar larvae are starved for 8 h and gently introduced into the center of each compartment. 20 larva are screened per treatment, and each experiment is repeated three times. The weight of rice grains is measured again after 1 week. The selective antifeeding rate (%) formula is [(C−T)/(C+T)]×100, and the non-selective antifeeding rate (%) formula is [(C−T)/C]×100, where C and T are the areas consumed by the control and treated leaf disks, respectively. The results are set forth in Table 15.

TABLE 15

Sitostroga cerealella

| 10% Compound in a 5% Ethanol:95% water solution | % Antifeedent Activity |
|---|---|
| Control (Triton X:water solution) | 0 |
| Apritone | 70 |
| Methyl Apritone | 70 |
| Apritol | 70 |

TABLE 15-continued

Sitostroga cerealella

| 10% Compound in a 5% Ethanol:95% water solution | % Antifeedent Activity |
|---|---|
| Methyl dihydrojasmolate | 60 |
| Methyl dihydrojasmonate | 60 |
| Propyl dihydrojasmonate | 60 |
| 3-methyl-5-hexyl-2-cyclohexanone | 60 |
| Gamma Tridecalactone | 70 |
| Delta-dodecalactone | 70 |

The feeding deterrent compounds of this disclosure may be blended with active repellents or toxicants including, but not limited to, N,N-Diethyl-m-toluamide (DEET®) and p-Menthane-3,8-diol (PMD).

While the disclosure has been described herein with reference to the specific embodiments thereof, it will be appreciated that changes, modification and variations can be made without departing from the spirit and scope of the inventive concept disclosed herein. Accordingly, it is intended to embrace all such changes, modification and variations that fall with the spirit and scope of the appended claims.

I claim:

1. A method for deterring the feeding of one or more insect pests selected from the group consisting of the genera: Tineola, Sitotroga, Sitophilus, Cydia, Grapholita, Ostrinia, Plodia, Galleria, Manduca, Hyphantria, Lymantria, Agrotis, Trichoplusia, Spodoptera, Helicoverpa, Heliothis, Leptinotarsa, Popillia, Ips, Anthonomus, Cyclas, Crioceris, Oryzaephilus, Oulema, Anoplophora, Stegobium, Agroites, Agrilus, Epilachna, Dermestes, Lygus, Blissus, Euschistus, Nezara, Homalodisca, Circulifer, Typhlocyba, Diaphorina, Bactericera, Bemisia, Trialeurodes, Myzus, Aphis, Macrosiphum, Eriosoma, and Dysaphis, said method comprising:
contacting of the pests with an effective amount of a formulation comprising at least one of the compounds selected from the group consisting of:

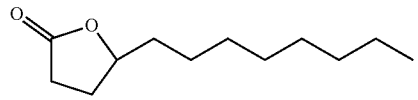

5-octyldihydrofuran-2(3H)-one
Chemical Formula: $C_{12}H_{22}O_2$
Molecular Weight: 198.30
gamma-dodecalactone

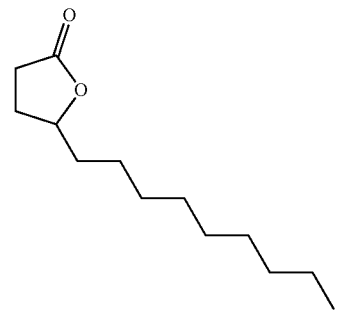

5-nonyldihydrofuran-2(3H)-one
Chemical Formula: $C_{13}H_{24}O_2$
Molecular Weight: 212.33
Gamma-Tridecalactone

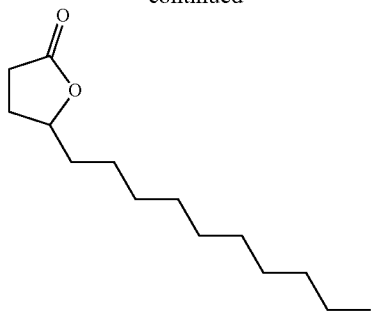

5-decyldihydrofuran-2(3H)-one
Chemical Formula: $C_{14}H_{26}O_2$
Molecular Weight: 226.36
Gamma-Tetradecalactone

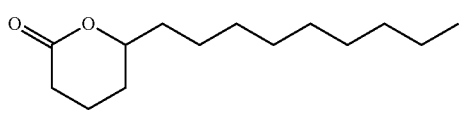

5-nonyltetrahydrofuran-2H-
pyran-2-one
Chemical Formula: $C_{14}H_{26}O_2$
Molecular Weight: 226.36
Delta-Tetradecalactone

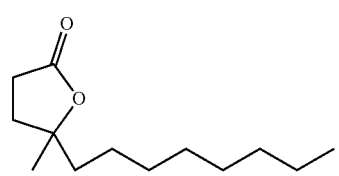

Gamma Methyl Dodecalactone
2(3H)-Furanone,
5-octyldihydro-5-methyl

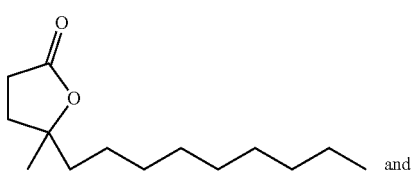

and gamma Methyl Tridecalactone
5-methyl-5-nonyldihydrofuran-
2(3H)-one
4-methyl-4-nonyl gamma
butyrolactone C14 lactone

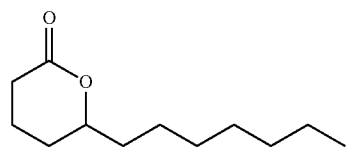

Delta Dodecalactone
6-heptyltetrahydro-2H-pyran-2-one.

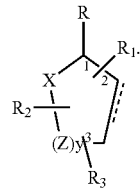

(I)

2. A method for deterring the feeding of one or more insect pests selected from the group consisting of the genera: *Tineola, Sitotroga, Sitophilus, Cydia, Grapholita, Ostrinia, Plodia, Galleria, Manduca, Hyphantria, Lymantria, Agrotis, Trichoplusia, Spodoptera, Helicoverpa, Heliothis, Leptinotarsa, Popillia, Ips, Anthonomus, Cyclas, Crioceris, Oryzaephilus, Oulema, Anoplophora, Stegobium, Agroites, Agrilus, Epilachna, Dermestes, Lygus, Blissus, Euschistus, Nezara, Homalodisca, Circulifer, Typhlocyba, Diaphorina, Bactericera, Bemisia, Trialeurodes, Myzus, Aphis, Macrosiphum, Eriosoma,* and *Dysaphis,* said method comprising:
contacting of the pests with an effective amount of a formulation comprising at least one of the compounds of the structure (I)

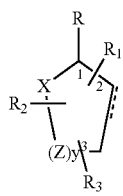

(I)

wherein:
R is =O;
X is O;
each Z is independently selected from the group consisting of (CH) and ($CH_2$);
y is a numeral selected from 1 and 2;
$R_1$ is selected from the group consisting of H and a branched or straight chain, saturated or unsaturated hydrocarbyl group with zero to two double bonds and from 1 to 15 carbon atoms;
$R_2$ is selected from the group consisting of H and a branched or straight chain, saturated or unsaturated hydrocarbyl group with zero to three double bonds and from 1 to 15 carbon atoms;
$R_3$ is selected from the group consisting of H and a branched or straight chain, saturated or unsaturated hydrocarbyl group with zero to three double bonds and from 1 to 15 carbon atoms;
the bond between the 2 and 3 positions in the ring structure is a single bond, and
wherein the compounds of structure (I) contain from 9 to 20 total carbon atoms in the compounds.

3. The method according to claim 2 wherein the compound comprises:
R is =O, X is O, y is 1 or 2, each Z is selected from the group consisting of (CH) and ($CH_2$), the bond between positions 2 and 3 in the ring is a single bond, one of $R_1$ and $R_2$ is H or —$CH_3$ and the other of $R_1$ and $R_2$ is a hydrocarbyl group containing from 9 to 15 carbon atoms and 0 to 3 double bonds, and $R_3$ is H.

4. The method of claim 2 wherein the compound comprises:

R is ═O, X is O, y is 1 or 2, each Z is selected from (CH) and (CH$_2$), the bond between positions 2 and 3 in the ring is a single or double bond, one of R$_1$ and R$_2$ is H and the other of R$_1$ and R$_2$ is a hydrocarbyl group containing from 9 to 15 carbon atoms and 0 to 3 double bonds, and R$_3$ is selected from the group consisting of —C(O)OR$_5$ and —CH$_2$C(O)R$_8$ where R$_5$ and R$_8$ are each selected from a hydrocarbyl group containing from 1 to 6 carbon atoms.

5. The method according to claim 4 wherein R is ═O, y is 1, the bond between positions 2 and 3 in the ring is a single bond, and R$_2$ and R$_5$ are each —CH$_3$.

6. The method according to claim 2 wherein the compound comprises:

R is ═O, X is O, y is 1 or 2, each Z is selected from the group consisting of (CH) and (CH$_2$), the bond between positions 2 and 3 of the rings is a single or double bond, one of R$_1$ and R$_2$ is H and the other of R$_1$ and R$_2$ is a hydrocarbyl group containing group containing from 9 to 15 carbon atoms and 0 to 3 double bonds, and R$_3$ is selected from the group consisting of —C(O)OR$_5$ and —CH$_2$C(O)R$_8$ where R$_5$ and R$_8$ are each selected from a hydrocarbyl group containing from 1 to 6 carbon atoms and wherein the total number of carbon atoms in the compounds of structure (I) is from 11 to 17.

7. The method according to claim 6 wherein the bond between positions 2 and 3 of the rings is a single bond and R$_5$ and R$_7$ are each selected from a hydrocarbyl group containing from 3 to 5 carbon atoms.

8. The method according to claim 6 wherein the bond between positions 2 and 3 of the rings is a single bond and R$_5$ and R$_7$ are each —CH$_3$.

9. The method according to claim 2 wherein the at least one compound of structure (I) is a compound wherein:

R is ═O, X is O, y is 1 or 2, each Z is selected from (CH) and (CH$_2$), the bond between positions 2 and 3 in the ring is a single bond, R$_1$ is an alkyl group containing from 5 to 13 carbon atoms, R$_2$ is selected from the group consisting of H or —CH$_3$, and R$_3$ is H.

10. The method according to claim 9 wherein:

R$_1$ is an alkyl group of from 5 to 10 carbon atoms such that the compound of structure (I) contains from 11 to 14 total carbon atoms.

11. A method for deterring the feeding of one or more insect pests selected from the group consisting of the genera: *Tineola, Sitotroga, Sitophilus, Cydia, Grapholita, Ostrinia, Plodia, Galleria, Manduca, Hyphantria, Lymantria, Agrotis, Trichoplusia, Spodoptera, Helicoverpa, Heliothis, Leptinotarsa, Popillia, Ips, Anthonomus, Cyclas, Crioceris, Oryzaephilus, Oulema, Anoplophora, Stegobium, Agroites, Agrilus, Epilachna, Dermestes, Lygus, Blissus, Euschistus, Nezara, Homalodisca, Circulifer, Typhlocyba, Diaphorina, Bactericera, Bemisia, Trialeurodes, Myzus, Aphis, Macrosiphum, Eriosoma*, and *Dysaphis*, said method comprising:

contacting of the pests with an effective amount of a formulation comprising at least one of the compounds selected from the group consisting of:

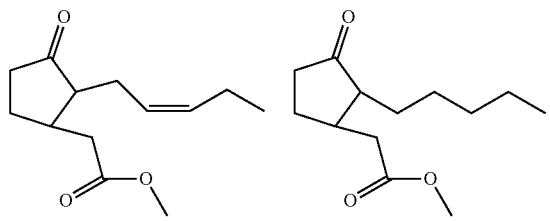

(Z)-methyl 2-(3-oxo-2-(pent-2-enyl)cyclopentyl)acetate
Chemical Formula: C$_{13}$H$_{20}$O$_3$
Molecular Weight: 224.30
Methyl Jasmonate methyl 2-(3-oxo-2-pentylcyclopentyl)acetate
Chemical Formula: C$_{13}$H$_{20}$O$_3$
Molecular Weight: 226.31
Methyl Dihydro Jasmonate

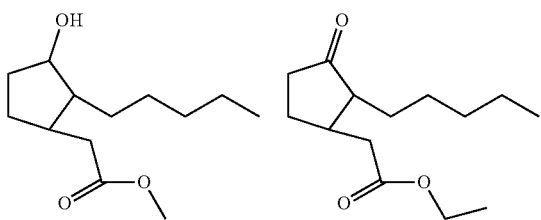

methyl 2-(3-hydroxy-2-pentylcyclopentyl)acetate
Chemical Formula: C$_{13}$H$_{24}$O$_3$
Molecular Weight: 228.33
Methyl Dihydro Jasmolate ethyl 2-(3-hydroxy-2-pentylcyclopentyl)acetate
Chemical Formula: C$_{14}$H$_{24}$O$_3$
Molecular Weight: 240.34
Ethyl Dihydro Jasmonate

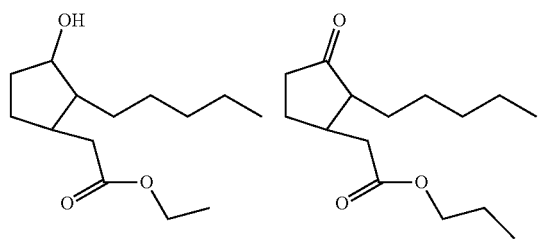

ethyl 2-(3-hydroxy-2-pentylcyclopentyl)acetate
Chemical Formula: C$_{14}$H$_{26}$O$_3$
Molecular Weight: 242.35
Ethyl Dihydro Jasmolate propyl 2-(3-oxo-2-pentylcyclopentyl)acetate
Chemical Formula: C$_{15}$H$_{26}$O$_3$
Molecular Weight: 254.37
Propyl Dihydro Jasmonate

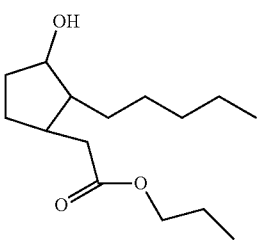

propyl 2-(3-hydroxy-2-pentylcyclopentyl)acetate
Chemical Formula: C$_{15}$H$_{28}$O$_3$
Molecular Weight: 256.38
Propyl Dihydro Jasmolate -continued

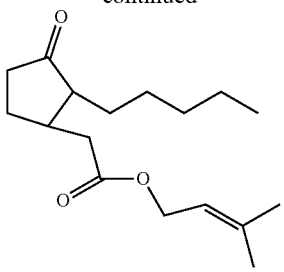

3-methylbut-2-enyl 2-
(3-oxo-2-
pentylcyclopentyl)acetate
Chemical Formula: $C_{17}H_{28}O_3$
Molecular Weight: 280.40
Prenyl Dihydro Jasmonate

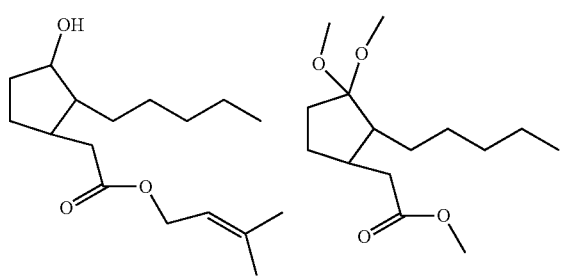

3-methylbut-2-enyl 2I-
(3-hyrdroxy-2-
pentylcyclopentyl)acetate
Chemical Formula: $C_{17}H_{30}O_3$
Molecular Weight: 282.42
Prenyl Dihydro Jasmolate Methyl 2-(3,3-dimethoxy-2-
pentylcyclopentyl)acetate
Chemical Formula: $C_{15}H_{28}O_4$
Molecular Weight: 272.38
Methyl Dihydro Jasmonate
Dimethyl Ketal

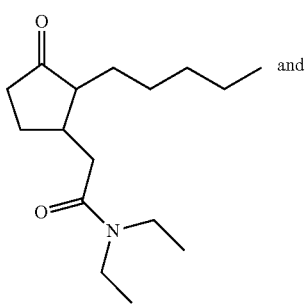

and

N,N-diethyl-2-(3-oxo-
pentylcyclopentyl)
acetamide
Chemical Formula: $C_{16}H_{29}NO_2$
Molecular Weight: 267.41
MDJ Amide -continued

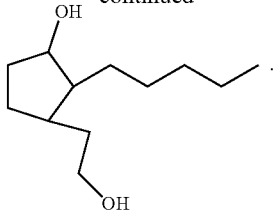

3-(2-hydroxyethyl)-2-
pentylcyclopentanol
Chemical Formula: $C_{12}H_{24}O_2$
Molecular Weight: 200.32
MethylDihydroJasmodiol 12. The method according to claim 2 wherein the at least one compound of structure (I) is selected from the group consisting of:

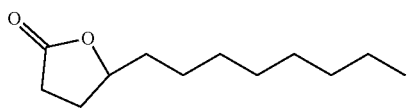

5-octyldihydrouran-2(3H)-one
Chemical Formula: $C_{12}H_{22}O_2$
Molecular Weight: 198.30
gamma-dodecalactone

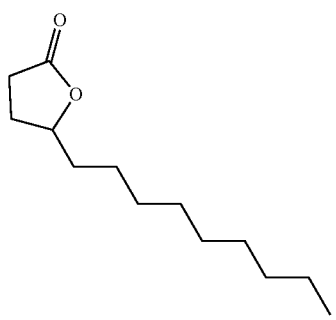

5-nonyldihydrofuran-2(3H)-one
Chemical Formula: $C_{13}H_{24}O_2$
Molecular Weight: 212.33
Gamma-Tridecalactone

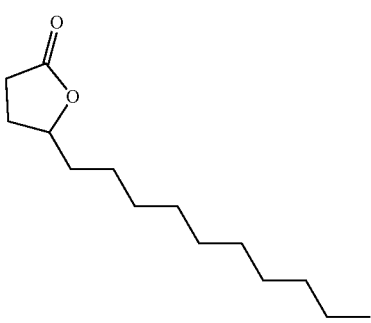

5-decyldihydrofuran-2(3H)-one
Chemical Formula: $C_{14}H_{26}O_2$
Molecular Weight: 226.36
Gamma-Tetradecalactone

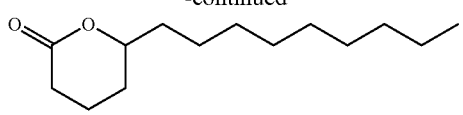

6-nonyltetrahydro-2H-pyran-2-one
Chemical Formula: $C_{14}H_{26}O_2$
Molecular Weight: 226.36
Delta-Tetradecalactone

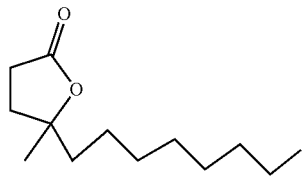

Gamma Methyl Dodecalactone
2(3H)-Furanone, 5-octyldihydro-5-methyl

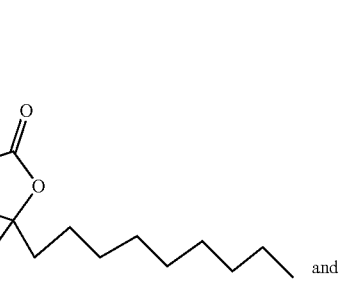

and gamma Methyl Tridecalactone
5-methyl-5-nonyldihydrofuran-2(3H)-one
4-methyl-4-nonyl gamma butyrolactone
C14 lactone

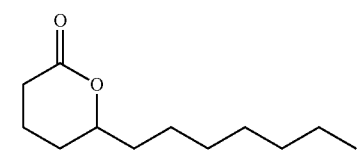

Delta Dodecalactone
6-heptyltetrahydro-2H-pyran-2-one.

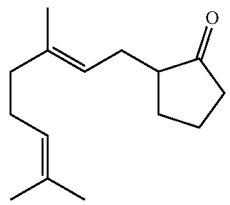

(E)-2-(3,7-dimethylocta-2,6-dienyl)cyclopentanone
Chemical Formula: $C_{15}H_{24}O$
Molecular Weight: 220.35
Apritone

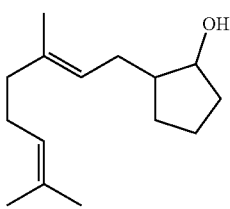

(E)-2-(3,7-dimethylocta-2,6-dienyl)cyclopentanal
Chemical Formula: $C_{15}H_{26}O$
Molecular Weight: 222.37
Apritol

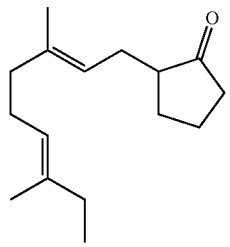

2-((2E,6E-3,7-dimethylnona-2,6-dienyl)cyclopentanone
Chemical Formula: $C_{16}H_{26}O$
Molecular Weight: 234.38
Methyl Apritone

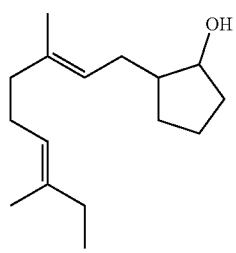

2-((2E,6E-3,7-dimethylnona-2,6-dienyl)cyclopentanol
Chemical Formula: $C_{16}H_{28}O$
Molecular Weight: 236.39
Methyl Apritol 13. A method for deterring the feeding of one or more insect pests selected from the group consisting of the genera: *Tineola, Sitotroga, Sitophilus, Cydia, Grapholita, Ostrinia, Plodia, Galleria, Manduca, Hyphantria, Lymantria, Agrotis, Trichoplusia, Spodoptera, Helicoverpa, Heliothis, Leptinotarsa, Popillia, Ips, Anthonomus, Cyclas, Crioceris, Oryzaephilus, Oulema, Anoplophora, Stegobium, Agroites, Agrilus, Epilachna, Dermestes, Lygus, Blissus, Euschistus, Nezara, Homalodisca, Circulifer, Typhlocyba, Diaphorina, Bactericera, Bemisia, Trialeurodes, Myzus, Aphis, Macrosiphum, Eriosoma*, and *Dysaphis*, said method comprising:

contacting of the pests with an effective amount of a formulation comprising at least one of the compounds selected from the group consisting of:

-continued

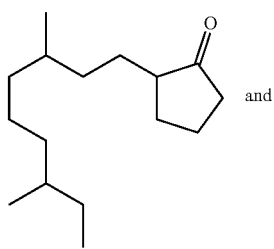

2-(3,7-dimethylnonyl)
cyclopentanone
Chemical Formula: $C_{16}H_{30}O$
Molecular Weight: 238.41
Tetrahydromethyl Apritone and

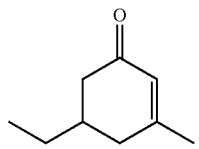

2-(3,7-dimethylnonyl)
cyclopentanol
Chemical Formula: $C_{16}H_{32}O$
Molecular Weight: 240.42
Tetrahydromethyl Apritol 14. A method for deterring the feeding of one or more insect pests selected from the group consisting of the genera: *Tineola, Sitotroga, Sitophilus, Cydia, Grapholita, Ostrinia, Plodia, Galleria, Manduca, Hyphantria, Lymantria, Agrotis, Trichoplusia, Spodoptera, Helicoverpa, Heliothis, Leptinotarsa, Popillia, Ips, Anthonomus, Cyclas, Crioceris, Oryzaephilus, Oulema, Anoplophora, Stegobium, Agroites, Agrilus, Epilachna, Dermestes, Lygus, Blissus, Euschistus, Nezara, Homalodisca, Circulifer, Typhlocyba, Diaphorina, Bactericera, Bemisia, Trialeurodes, Myzus, Aphis, Macrosiphum, Eriosoma*, and *Dysaphis*, said method comprising:

contacting of the pests with an effective amount of a formulation comprising at least one of the compounds selected from the group consisting of:

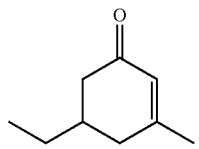

5-Ethyl-3-methyl-2-
cyclohexenone
Chemical Formula: $C_9H_{14}O$
Molecular Weight: 138.21

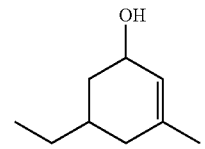

5-Ethyl-3-methyl-2-
cyclohexen-1-ol
Chemical Formula: $C_9H_{16}O$
Molecular Weight: 140.22

-continued

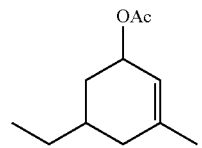

5-Ethyl-3-methyl-2-
cyclohexen-1-yl Acetate
Chemical Formula: $C_{11}H_{18}O_2$
Molecular Weight: 182.26

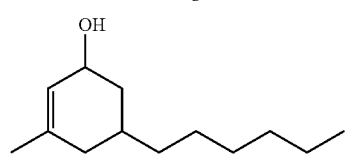

3-methyl-5-hexyl-2-
cyclohexenol
Chemical Formula: $C_{14}H_{26}$
Molecular Weight: 194.36

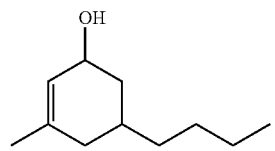

3-methyl-5-butyl-2-
cyclohexenol
Chemical Formula: $C_{12}H_{22}$
Molecular Weight: 166.31

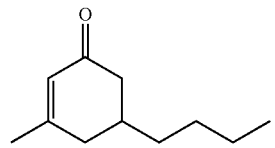

3-methyl-5-butyl-2-
cyclohexenone
Chemical Formula: $C_{11}H_{18}O$
Molecular Weight: 166.26

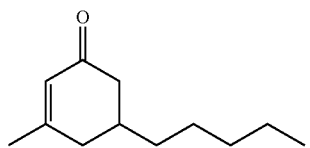

3-methyl-5-pentyl-2-
cyclohexenone
Chemical Formula: $C_{12}H_{20}O$
Molecular Weight: 180.29

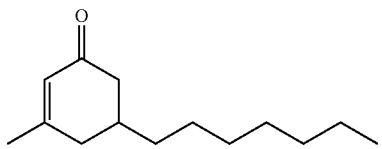

3-methyl-5-heptyl-2-
cyclohexenone
Chemical Formula: $C_{14}H_{24}O$
Molecular Weight: 208.34

-continued

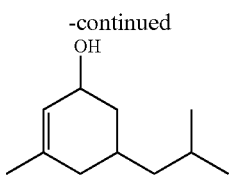

3-methyl-5-isobutyl-2-
cyclohexen-1-ol
Chemical Formula: $C_{11}H_{20}O$
Molecular Weight: 168.28

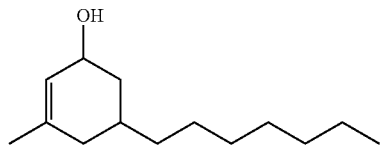

3-methyl-5-heptyl-2-
cyclohexen-1-ol
Chemical Formula: $C_{14}H_{26}O$
Molecular Weight: 210.36

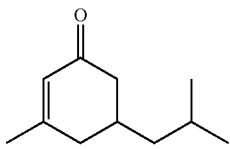

3-methyl-5-isobutyl-2-
cyclohexenone
Chemical Formula: $C_{11}H_{18}O$
Molecular Weight: 166.26

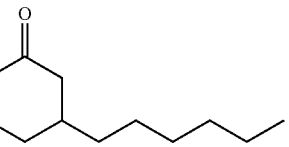

3-methyl-5-hexyl-2-
cyclohexenone
Chemical Formula: $C_{13}H_{22}O$
Molecular Weight: 194.31

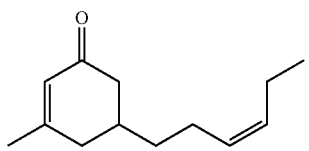

3-methyl-5-(z-hexenyl)-2-
cyclohexenone
Chemical Formula: $C_{13}H_{20}O$
Molecular Weight: 192.30

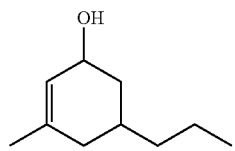

3-methyl-5-propyl-2-
cyclohexen-1-ol
Chemical Formula: $C_{10}H_{18}O$
Molecular Weight: 154.25

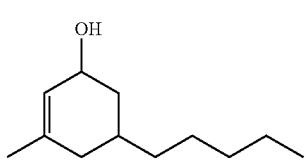

3-methyl-5-pentyl-2-
cyclohexen-1-ol
Chemical Formula: $C_{12}H_{22}O$
Molecular Weight: 182.30

-continued

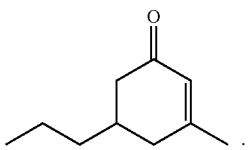

2-Cyclohexen-1-one,
3-methyl-5-propyl-
Chemical Formula: $C_{10}H_{16}O$
Molecular Weight: 152.23

15. A method for deterring the feeding of one or more insect pests selected from the group consisting of the genera: *Tineola, Sitotroga, Sitophilus, Cydia, Grapholita, Ostrinia, Plodia, Galleria, Manduca, Hyphantria, Lymantria, Agrotis, Trichoplusia, Spodoptera, Helicoverpa, Heliothis, Leptinotarsa, Popillia, Ips, Anthonomus, Cyclas, Crioceris, Oryzaephilus, Oulema, Anoplophora, Stegobium, Agroites, Agrilus, Epilachna, Dermestes, Lygus, Blissus, Euschistus, Nezara, Homalodisca, Circulifer, Typhlocyba, Diaphorina, Bactericera, Bemisia, Trialeurodes, Myzus, Aphis, Macrosiphum, Eriosoma*, and *Dysaphis*, said method comprising:

contacting of the pests with an effective amount of a formulation comprising at least one of the compounds selected from the group consisting of:

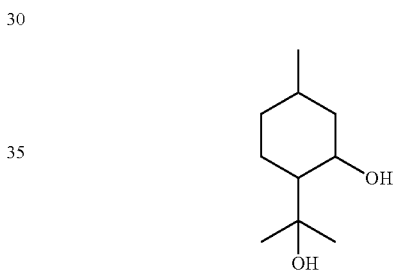

Cyclohexanementhanol,
2-hydroxy-a,a,4-trimethyl-
Chemical Formula: $C_{10}H_{20}$
Molecular Weight: 172.26
Para-Menthane-3,8-Diol
(PMD)

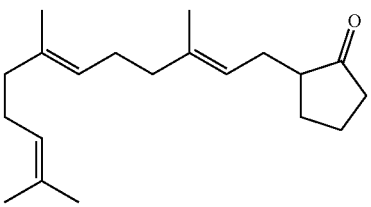

2-((2E,6E)-3,7,11-trimethyldodeca-
2,6,10-trienyl)cyclopentanone
Chemical Formula: $C_{20}H_{32}O$
Molecular Weight: 288.47
Farnesylcyclopentanone

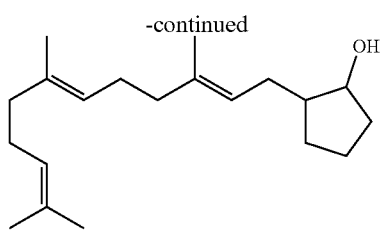

2-((2E,6E)-3,7,11-trimethyldodeca-
2,6,10-trienyl)cyclopentanol
Chemical Formula: $C_{20}H_{34}O$
Molecular Weight: 290.48
Farnesylcyclopentanol

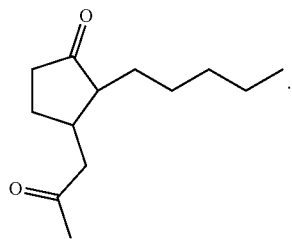

3-(2-oxopropyl)-2-
pentylcyclopentanone
Chemical Formula: $C_{13}H_{22}O_2$
Molecular Weight: 210.31
Amyl Cyclopentanone Propanone 16. The method according to claim 1 wherein the compound is applied to or near crops, seeds, agricultural or ornamental trees, plants, vegetation, fibers, woven fibers, grains, processed grain, produce or packaging materials, by way of a formulation selected from the group consisting of direct spray formulations, fogger formulations, microencapsulated formulations, soil treatment formulations, seed treatment formulations, injectable formulations for injection into or onto plants or crops, granular pellets, release devices, clay-based powders, and formulations for evaporative devices.

17. The method of claim 2 wherein the at least one compound of structure (I) is selected from the group consisting of: gamma-dodecalactone, gamma-tridecalactone, gamma methyl dodecalactone, delta dodecalactone, and gamma methyl tridecalactone.

18. The method according to claim 1 wherein the compound is present in the formulation in an amount sufficient to provide increased pest repellency or mortality over control pest repellency or mortality of at least 1%.

19. The method of claim 1 wherein the formulation is used to treat food or crops such that the treated food or crops have from about 0.05 to about 500 mg/sq. in. of at least one of the compounds thereon.

20. The method according to claim 2 wherein the compounds of structure (I) have from 10 to 16 carbon atoms in the compound.

* * * * *